(12) United States Patent
Tanaka et al.

(10) Patent No.: US 7,089,640 B2
(45) Date of Patent: Aug. 15, 2006

(54) TOOL FOR INSTALLING RETAINING RING

(75) Inventors: Kouichi Tanaka, Nagoya (JP); Yoshichika Tanaka, Nagoya (JP)

(73) Assignee: Chubu Bearing Kabushiki Kaisya, Aichi (JP)

( * ) Notice: Subject to any disclaimer, the term of this patent is extended or adjusted under 35 U.S.C. 154(b) by 0 days.

(21) Appl. No.: 11/124,428

(22) Filed: May 6, 2005

(65) Prior Publication Data

US 2005/0262677 A1      Dec. 1, 2005

Related U.S. Application Data

(63) Continuation of application No. PCT/JP03/14169, filed on Nov. 7, 2003.

(30) Foreign Application Priority Data

Nov. 7, 2002   (JP) .............................. 2002-324292
Dec. 13, 2002  (JP) .............................. 2002-362103

(51) Int. Cl.
    *B23P 19/04*  (2006.01)
(52) U.S. Cl. ..................... 29/229; 29/243.56
(58) Field of Classification Search ................ 29/229, 29/243.56, 270, 278; 254/28
See application file for complete search history.

(56) References Cited

U.S. PATENT DOCUMENTS

| 4,592,122 A | * | 6/1986 | Sikula ....................... | 29/229 |
| 4,942,655 A | * | 7/1990 | Buzzelli .................... | 29/229 |
| 6,125,517 A | * | 10/2000 | Yu .......................... | 29/229 |

FOREIGN PATENT DOCUMENTS

| JP | 53-148800 | | 12/1978 |
| JP | 61-163176 | U | 10/1986 |
| JP | 52-31100 | | 9/1993 |
| JP | 6-16654 | Y2 | 5/1994 |
| JP | 07-009274 | A | 1/1995 |
| JP | 3010240 | U | 2/1995 |
| JP | 7-40076 | U | 7/1995 |
| JP | 11-28680 | A | 2/1999 |
| WO | WO 2004/043651 | A3 | 5/2004 |

* cited by examiner

*Primary Examiner*—Lee D. Wilson
(74) *Attorney, Agent, or Firm*—Flynn, Thiel, Boutell & Tanis, P.C.

(57) ABSTRACT

A problem where a tool is deformed when a retaining ring is fitted on a shaft is solved. Plate members (2, 2*a*) positioned at at least one side of a full back surface of a retaining ring (W) are arranged at a holder (1) provided at the head of a tool body. A contact portion (3), a portion opposite an opening portion (Y) in the outer periphery of the retaining ring (W), is provided more backward than the heads of the plate members (2, 2*a*). A fall-off prevention structure (4) from which the retaining ring (W) can be easily detached is provided at the holder (1). There are sheltering spaces (5, 5*a*) arranged outside both side portions of the retaining ring (W) in its installed state. When the retaining ring (W) is installed to the holder (1), the retaining ring (W) does not fall off because of the fall-off prevention structure (4). Further, even when the retaining ring (W) is slightly opened by being pressed by the contact portion (3) when the ring is fitted on a shaft (S), both side portions do not come into contact with the holder (1) side and therefore the holder (1) is not deformed.

6 Claims, 20 Drawing Sheets

(a)

(b)

TOOL FOR INSTALLING RETAINING RING

This is a continuation of International Application No. PCT/JP03/14169, filed Nov. 7, 2003, which International Application was not published in English.

TECHNICAL FIELD TO WHICH THE INVENTION PERTAINS

The present invention relates to an installing tool to be used in fitting a retaining ring having an opening, such as a retaining ring of type C or type E, to a shaft.

BACKGROUND ART

Conventionally, there were a number of said installing tools (Refer to Patent Documents 1 to 6, for instance) wherein in a holding part of the retaining ring is provided a circular arc shaped notch being slightly larger than a half circle so that it does not abut an shaft of the retaining ring when it is fitted on said shaft, wherein not only grooves holding the retaining ring are formed in said notch, but also a slit is formed in the center area of the notch and the grooves in the vertical direction, wherein application of the opening of the retaining ring to the shaft and pressing of the installing tool, after inserting an outside diameter area of the retaining ring into the holding part so that the opening faces an end, slightly expand and open the retaining ring and then the holding part as well, which fits the retaining ring on the shaft.

[Patent Document 1] Unexamined Utility Model Publication No. 52-31100 (FIG. 1)

[Patent Document 2] Unexamined Patent Publication (Kokai) No. 53-148800 (Page 2, FIG. 1)

[Patent Document 3] Examined Utility Model Publication No. 6-16654 (Page 2, FIG. 1 to FIG. 2)

[Patent Document 4] Unexamined Utility Model Publication No. 7-40076 (Page 6, FIG. 2)

[Patent Document 5] Registered Utility Model Publication No. 3010240 (Pages 6–7, FIG. 10)

[Patent Document 6] Unexamined Patent Publication (Kokai) No. 11-28680 (Page 2, FIG. 4)

However, there was a problem to solve in the installing tool of the prior art. When it is fitted, the holding part at the end of the tool must open. Nevertheless, if it is made easily deformable, pushing force might deform it when it is fitted, and it could not be fitted. Thus, as it needs strength to some degree, resistance increases when it is pushed in, and more pushing force than necessary will be necessary, which thus makes the entire fitting work inefficient.

DISCLOSURE OF THE INVENTION

In light of the problem based on the prior art described above that the tool side has to be deformed when it is fitted on the shaft of the retaining ring, the present invention provides a tool to be used for a retaining ring having a cut in the outer periphery wherein on an end surface of a holder provided on an end of the tool itself is formed a depression into which a portion opposite to at least an opening in the retaining ring is movably inserted, a full back surface of the movably inserted depression at the end of the holder shall be plate members, a back area in the inner periphery of the movably inserted depression shall be a contact portion of the portion opposite to the opening in the outer periphery, and sheltering spaces are arranged outside both sides of the retaining ring in its installed state. As a fall-off prevention means from which the retaining ring can be easily detached is provided on the holder, installation of the retaining ring on said holder allows the fall-off prevention means to prevent the retaining ring from dropping. The contact portion presses the retaining ring when it is fitted on the shaft, and even when the retaining ring is slightly pressed and expanded, the retaining ring does not abut the holder. Thus, the present invention solves the above problem.

In addition, a position control means that is located in a cut of the retaining ring in its installed state is provided in the back side of said movably inserted depression. Thus, even if the retaining ring moves with respect to the tool itself when it is fitted, the position control means prevents its further movement, thus suppressing possible misalignment of the retaining ring, which tends to be easily generated in the early stage of the fitting work.

To be specific, since at the end surface of the holder provided on the end of the tool itself is formed the depression into which the portion opposite to at least the opening in the retaining ring is movably inserted, parts on the side of a full back surface of the movably inserted depression at the end of the holder shall be plate members, and the back area in the inner periphery of the movably inserted depression shall be the contact portion of the portion opposite to the opening in the outer periphery of the retaining ring, the plate members can support both of the full back surfaces of the retaining ring. This could deter detachment of the retaining ring from the holder during fixing, and yet press the retaining ring in its installed state at the contact portion toward the shaft to which the retaining ring is to be mounted. In addition, provision on the holder of the fall-off prevention means from which the retaining ring can be easily detached allows the retaining ring to be installed on the holder. Thus, the retaining ring, with it attached to the holder, can be carried to a fitting work position and easily detached from the holder after being fitted on the shaft.

In addition, because of the sheltering spaces arranged outside both sides of the retaining ring in its installed state, the outer periphery of the both sides of the retaining ring does not abut the holder even if the contact portion pushes the portion opposite to the opening in the outer periphery of the retaining ring when it is fitted, the opening expands, and thus the retaining ring is pressed and expanded. This allows the retaining ring to be fitted on the shaft without deforming the holder, and enables reasonable fitting of the retaining ring.

In addition, a position control means positioned in the cut of the retaining ring in its installed state is provided in the back side of the movably inserted depression. Thus, unless the position control means is located in the cut of the retaining ring, it cannot be installed on the holder. This allows one to install the retaining ring on the holder in a good posture that makes the fitting work easy. And yet, as the position control means is located in the cut of the retaining ring, even when the retaining ring being attached to the holder rotates, the protrusions abut both inner edges of the cut and limit to slight rotation. Thus, the pushing force of the tool for installing the retaining ring can be directly transmitted, thus enabling easy fitting of the retaining ring.

Since not only dimension between the end of the holder and the contact portion is made wider than inside and outside widths of the retaining ring, but also an escape notch to completely expose a central hole of the retaining ring is formed in the end of the holder, the end of the holder do not abut the shaft during fitting, and the retaining ring can be reliably fitted on the shaft.

With the inner periphery of the movably inserted depression as a periphery whose diameter is greater than the outside diameter of the retaining ring, the sheltering spaces shall be arranged outside both sides of the retaining ring in its installed state in the movably inserted depression. This then enables easy insertion of the retaining ring into the movably inserted depression, and yet an outside surface of the portion opposite to the opening in the retaining ring can reliably abut the contact portion of the back area in the inner periphery of the movably inserted depression.

Steps are formed in an intermediate part of the both ends in the inner periphery of the movably inserted depression, and diameter of an area between the steps in the inner periphery is made almost identical to the outside diameter of the retaining ring. This then enables reliable positioning of the retaining ring within the movably inserted depression. In addition, as diameter of the both ends of the inner periphery is made greater than the outside diameter of the retaining ring, and the sheltering spaces are defined between the both sides of the retaining ring in its installed state and the inner periphery of the both ends in the movably inserted depression, abutment of the retaining ring when it is fitted against the holder of the outer periphery can be prevented.

Since fit protrusions provided in the center of the contact portion shall be the fall-off prevention means and the position control means, the retaining ring having the cut in the portion opposite to the opening in the retaining ring can be installed on the holder, i.e., can be installed by press fitting the fit protrusions into the cut.

Since the fall-off prevention means may be a narrowed area formed in the movably inserted depression, a sandwiched plate in which a base end is integrated into the holder, or a magnet embedded in the contact portion of the retaining ring in the holder, the retaining ring can be not only easily installed on the holder, but also easily removed from the holder.

In addition, the tool is used for the retaining ring having cuts in 2 places of the portion opposite to the opening, and a pair of protrusions not only is provided in the back side in the movably inserted depression, but also shall be the fall-off prevention means and the position control means, by setting dimension between said protrusions narrower than that between angular apertures to the center of the cuts provided in 2 places of the portion opposite to the opening in the retaining ring. Thus, dimension between the protrusions makes a very little difference from that between the angular apertures. Then, although the holder deforms, it can be deformed with less force, and thus, fitting of the retaining ring can be easily done and yet it does not deform when it is fitted on the shaft, thereby enabling reasonable fitting of the retaining ring.

In addition, a slit is formed in the center of the holder. Thus, although the holder deforms when the retaining ring is fitted, expansion of the slit makes it possible to deform the holder with less force, thus enabling fitting of the retaining ring to be done reasonably.

In addition, the tool is to be used for the retaining ring providing the cuts in the 2 places of the portion opposite to the opening. Not only a pair of elastic bodies is protruded from the inner peripheral bottom of the movably inserted depression, but also an interval between said elastic bodies is set narrower than the dimension between the angular apertures to the center of the cuts provided in 2 places of the portion opposite to the opening in the retaining ring, and they shall be the fall-off prevention means and the position control means. Thus, as the elastic bodies have only to be deformed during installation, the retaining ring can be easily installed and yet, when installing, as the retaining ring is held and positioned by elastic resilience of the elastic bodies, the pushing force of the tool for installing the retaining ring can be directly transmitted, thereby enabling easy fitting of the retaining ring. Hence, the practical effect thereof is enormous.

BEST MODE FOR CARRYING OUT THE INVENTION

Figure 1:
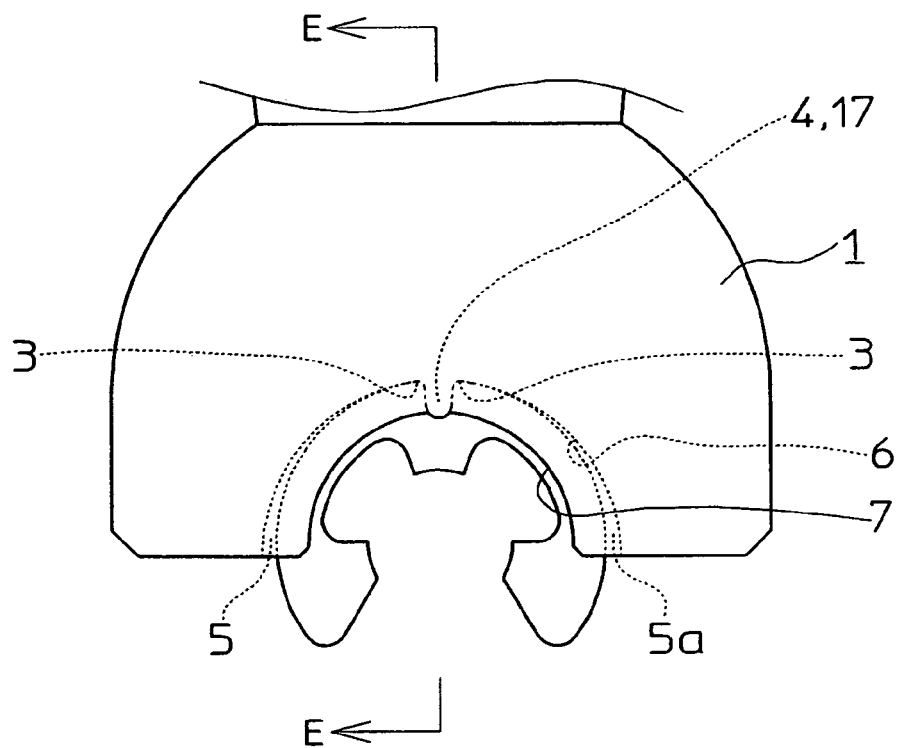
FIG. 1 is a front view of the end of the first embodiment of the tool for installing the retaining ring according to the present invention.

In the following one embodiment of the present invention is described.

Prior to fitting on a shaft S of a retaining ring W, an end of a tool for installing the retaining ring is made as a flattened holder 1 formed so as not to abut said shafts. In said holder 1 are provided plate members 2 (2a) positioned on at least one side of a full back surface of the retaining ring W, and a contact portion 3 that is an area opposite to an opening Y on the outer periphery of the retaining ring W is positioned more backward than the heads of said plate members 2 (2a). Then, configuration is such that a fall-off prevention means 4 from which the retaining ring W can be easily detached is provided in said holder 1, and pulling the tool for installing after pushing the retaining ring W into and installing it on the shaft allows the retaining ring W to be removed reasonably from said installation tool. In addition, the holder 1 is such formed that there are sheltering spaces 5, 5a outside both sides of the retaining ring W in its installed state.

Specifically, in the end surface of the holder 1, a depression 6 an opening of which is horizontally long is formed, into which a portion opposite to at least the opening Y in the retaining ring W is movably inserted. Said plate members 2, 2a shall be parts on the side of the full back surface of the movably inserted depression 6 in the holder 1, said contact portion 3 shall be back areas in the inner periphery of the movably inserted depression 6, and said fall-off prevention means 4 is provided in the movably inserted depression 6. In addition, the end surface of the holder 1 and the movably inserted depression 6 are formed so that the sheltering spaces 5, 5a are arranged outside the both sides of the retaining ring W inserted into the movably inserted depression 6, and an entire center hole X in the retaining ring W can be exposed.

There is also provided a means 27 for controlling the retaining ring W in its installed state to a largely correct position with respect to the holder 1.

To be specific, as described below, the first to the sixteenth embodiments are listed, which are sequentially described in the following.

FIRST AND SECOND EMBODIMENTS (REFER TO FIG. 1 TO FIG. 6.)

Figure 2:
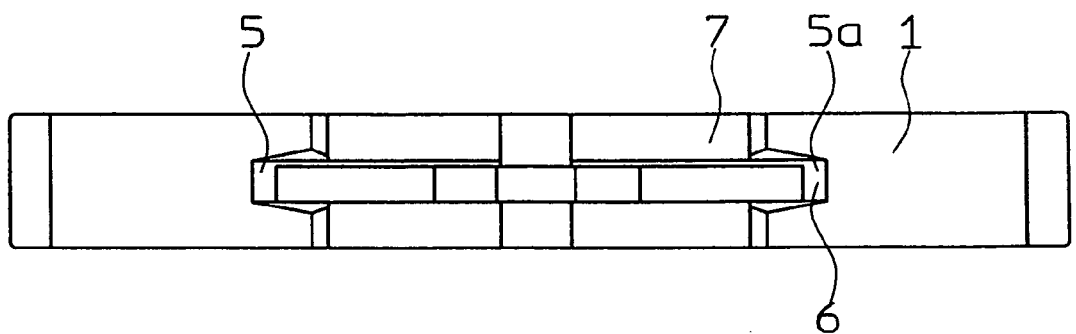
FIG. 2 is a bottom view of FIG. 1.
Figure 3:
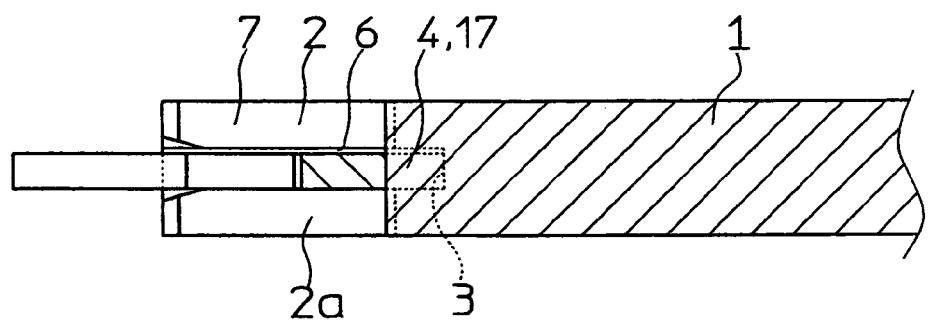
FIG. 3 is a sectional view of E—E of FIG. 1.
Figure 4:
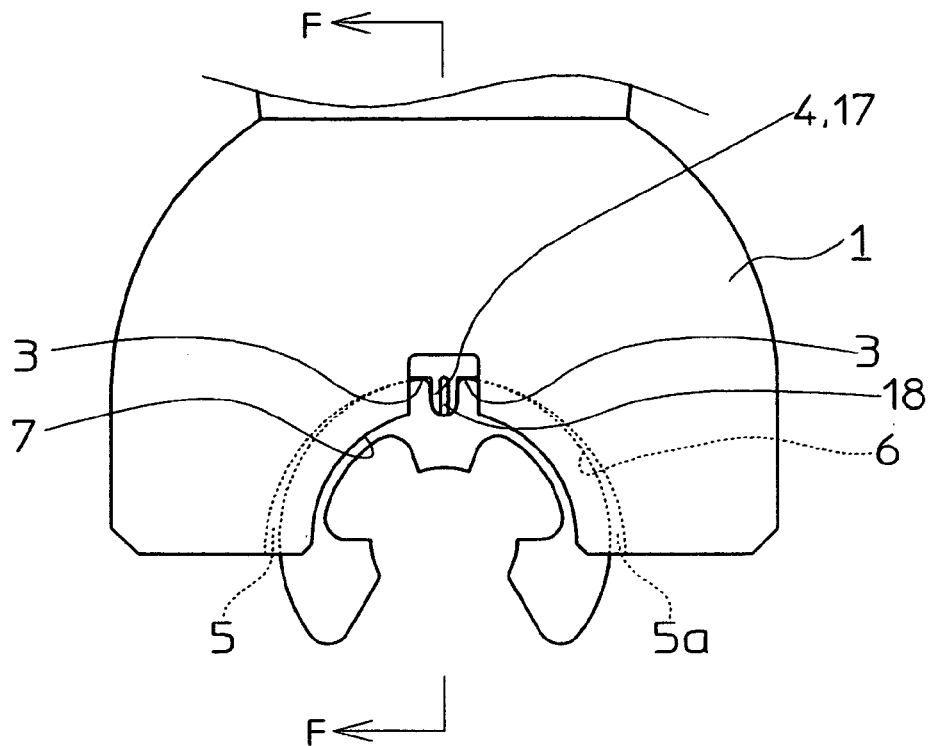
FIG. 4 is a front view of the end of the second embodiment of the tool for installing the retaining ring.
Figure 5:
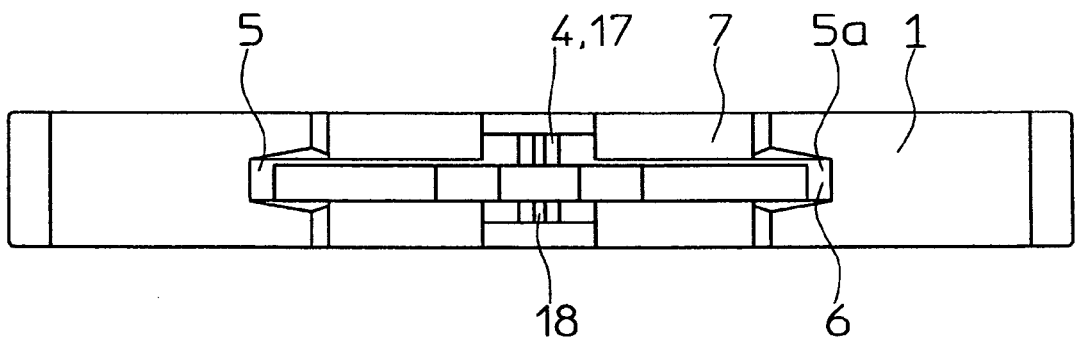
FIG. 5 is a bottom view of FIG. 4.
Figure 6:
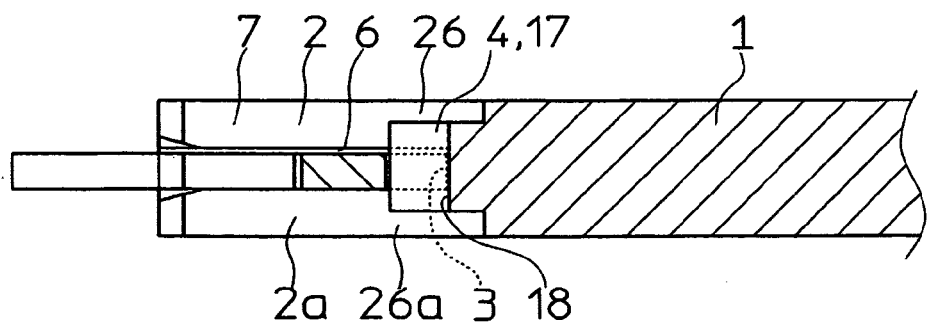
FIG. 6 is a sectional view of F—F of FIG. 4.

FIG. 1 and FIG. 4 are a front view of the end of the first and the second embodiments. FIG. 2 and FIG. 5 are a bottom view of FIG. 1 and FIG. 4. FIG. 3 and FIG. 6 are a sectional view of E—E and F—F of FIG. 1 and FIG. 4. At the end surface of the holder 1 is formed a movably inserted depression 6 with the inner periphery as a circumferential surface, and a semicircular escape notch 7 is formed at the end of the holder 1. By setting not only the inside diameter of the inner periphery of the escape notch 7 larger than that of a center hole X of the retaining ring W, but also the inside diameter of the peripheral bottom of the movably inserted depression 6 larger than the outside diameter of the retaining ring W, sheltering spaces 5, 5a are formed between both sides of the retaining ring W and the peripheral bottom of the movably inserted depression 6, and also the inner edges of the escape notch 7 are configured not to overlap the center hole X of the retaining ring W in its installed state.

Figure 50:
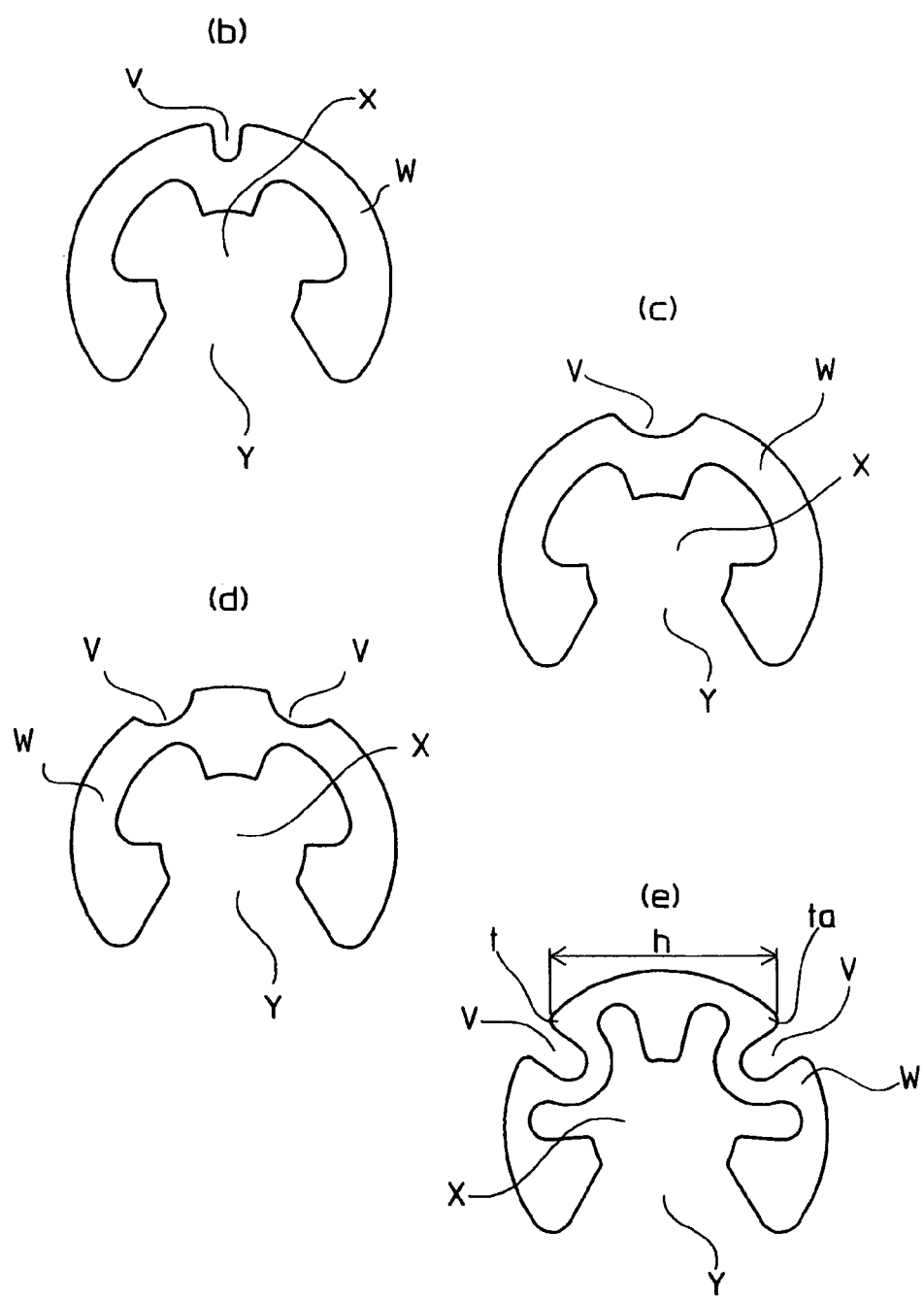
FIG. 50 is a front view showing 4 patterns of the retaining ring.

In addition, a fit protrusion 17 into the cut V of the retaining ring W as shown in FIG. 50(b) that is protruded from the inner peripheral bottom of the center part of the movably inserted depression 6 shall be a fall-off prevention means 4 and a position control means 27, and both sides of the fit protrusion 17 that is the back area in the inner periphery of the movably inserted depression 6 shall be the contact portion 3.

In addition, as with the fit protrusion 17 of the second embodiment as shown in FIG. 4, a cut 18 that opens at the end may be formed in order to facilitate fitting. In this case, the fit protrusion 17 is formed so that it is not integrated with the both internal surfaces of the movably inserted depression 6. Specifically, as shown in FIG. 6, the fit protrusion 17 is prevented from being integrated with the both internal surfaces of the movably inserted depression 6 by opening to form windows 26, 26a at the position on which the fit protrusion 17 is formed in the full back surface of the holder 1, as shown in FIG. 6.

THIRD EMBODIMENT (REFER TO FIG. 7 TO FIG. 9.)

Figure 7:
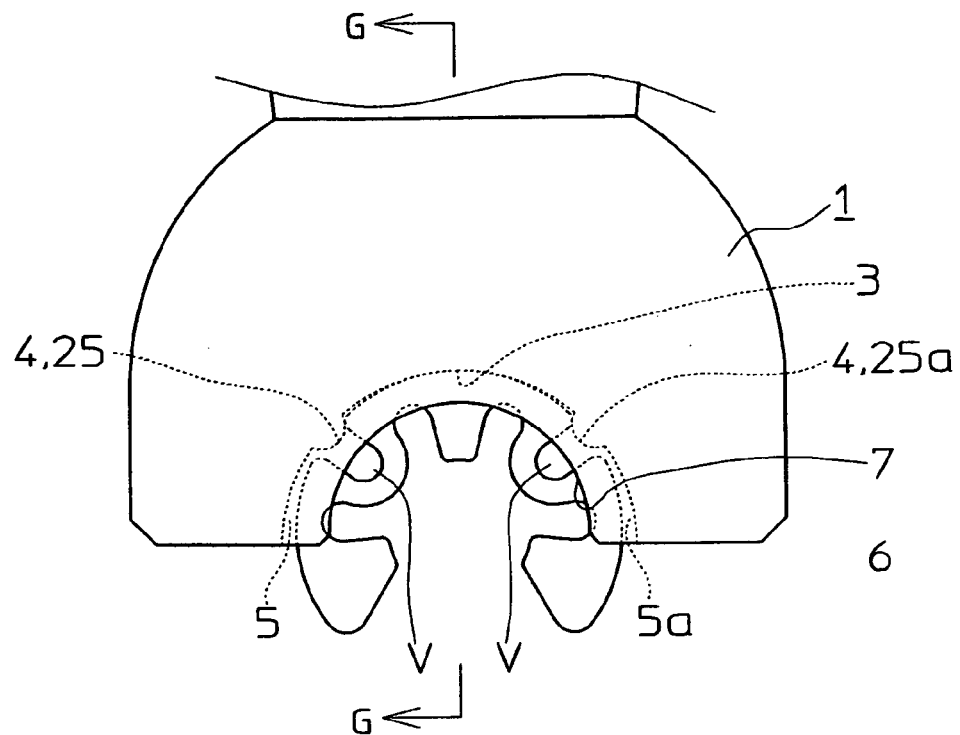
FIG. 7 is a front view of the end of the third embodiment of the tool for installing the retaining ring.
Figure 8:
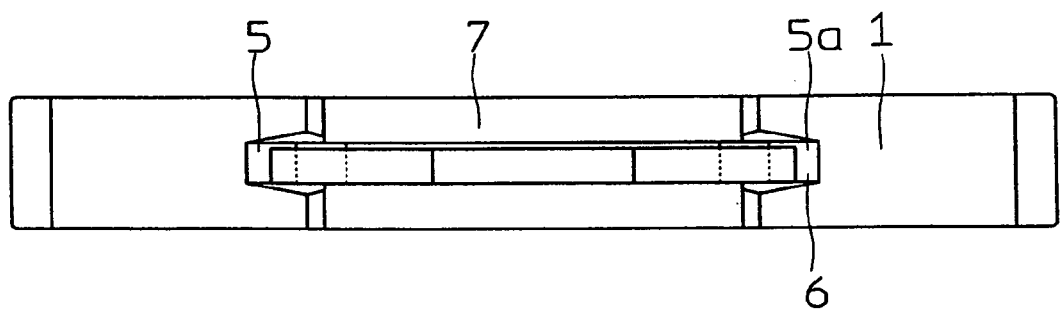
FIG. 8 is a bottom view of FIG. 7.
Figure 9:
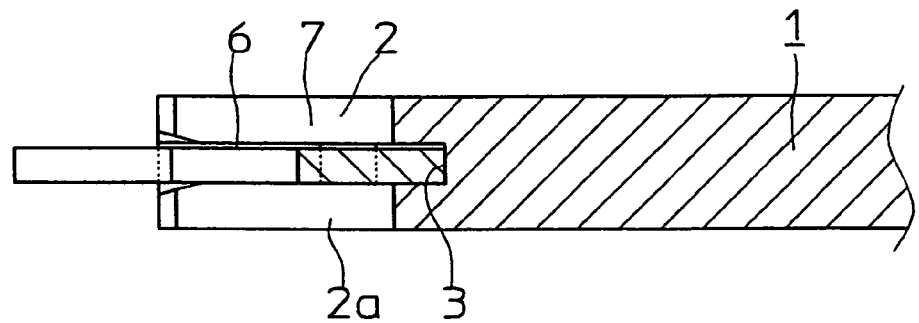
FIG. 9 is a sectional view of G—G of FIG. 7.

FIG. 7 to FIG. 9 are a front view and a bottom view of the end of the third embodiment, and a sectional view of G—G. Similar to the first embodiment, although the movably inserted depression 6, the escape notch 7, and the sheltering spaces 5, 5a are formed, adhesive protrusions 25, 25a that are similar to protrusions 33, 33a of the ninth embodiment described later and that are provided in 2 places in the back side in the movably inserted depression 6 shall be the fall-off prevention means 4 and the position control means 27, and the internal surfaces are so configured that they abut the angular apertures to the center of the cuts V, V provided in 2 places of the portion opposite to the opening Y in the retaining ring W as shown in FIG. 50(e).

FOURTH TO SIXTH EMBODIMENTS (REFER TO FIG. 10 TO FIG. 18.)

Figure 10:
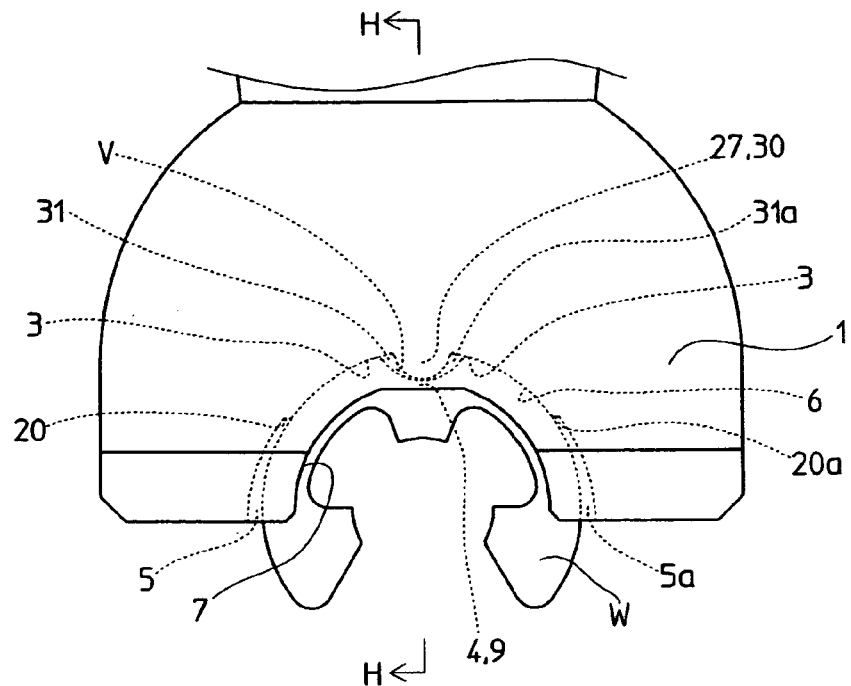
FIG. 10 is a front view of the end of the fourth embodiment of the tool for installing the retaining ring.
Figure 11:
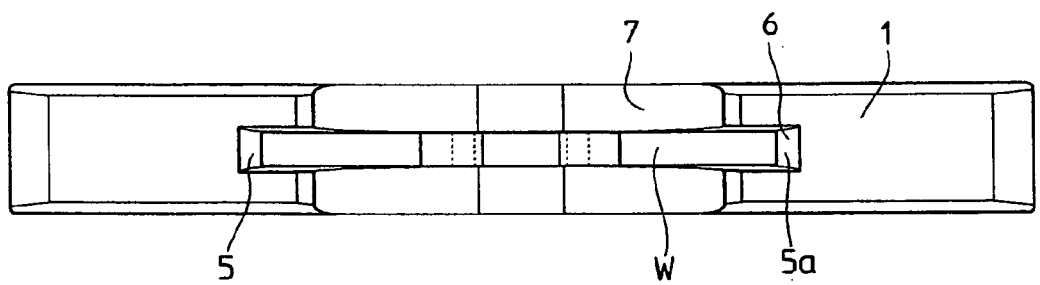
FIG. 11 is a bottom view of FIG. 10.
Figure 12:
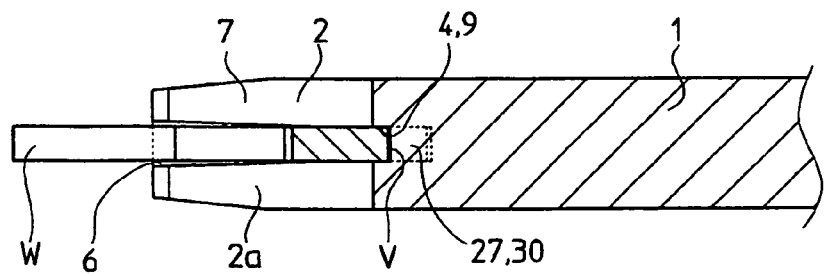
FIG. 12 is a sectional view of H—H of FIG. 10.
Figure 13:
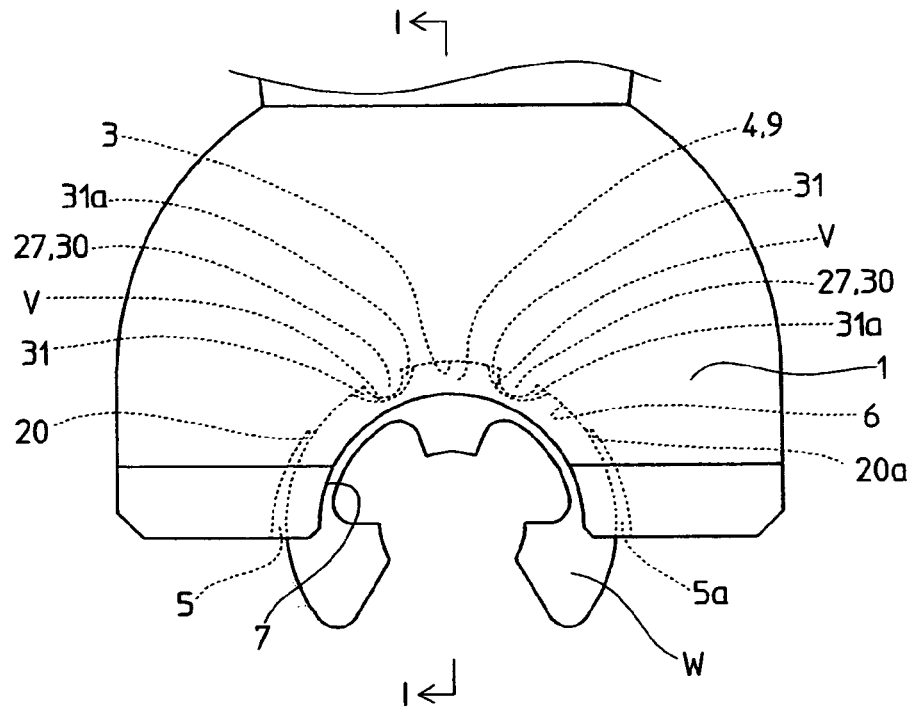
FIG. 13 is a front view of the end of the fifth embodiment of the tool for installing the retaining ring.
Figure 14:
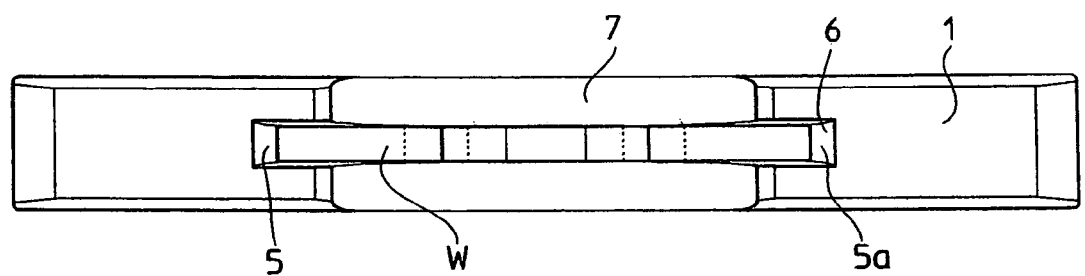
FIG. 14 is a bottom view of FIG. 13.
Figure 15:
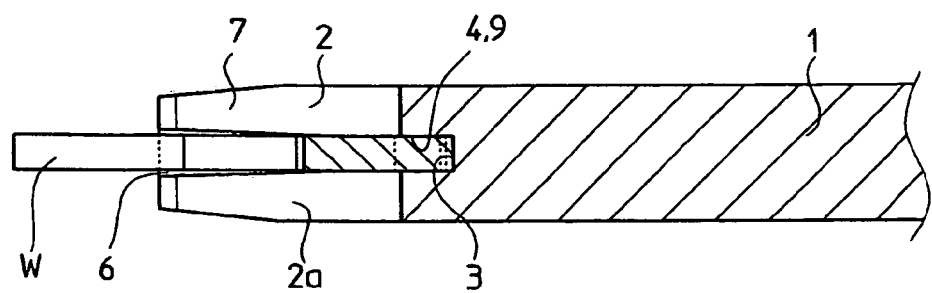
FIG. 15 is a sectional view of I—I of FIG. 13.
Figure 16:
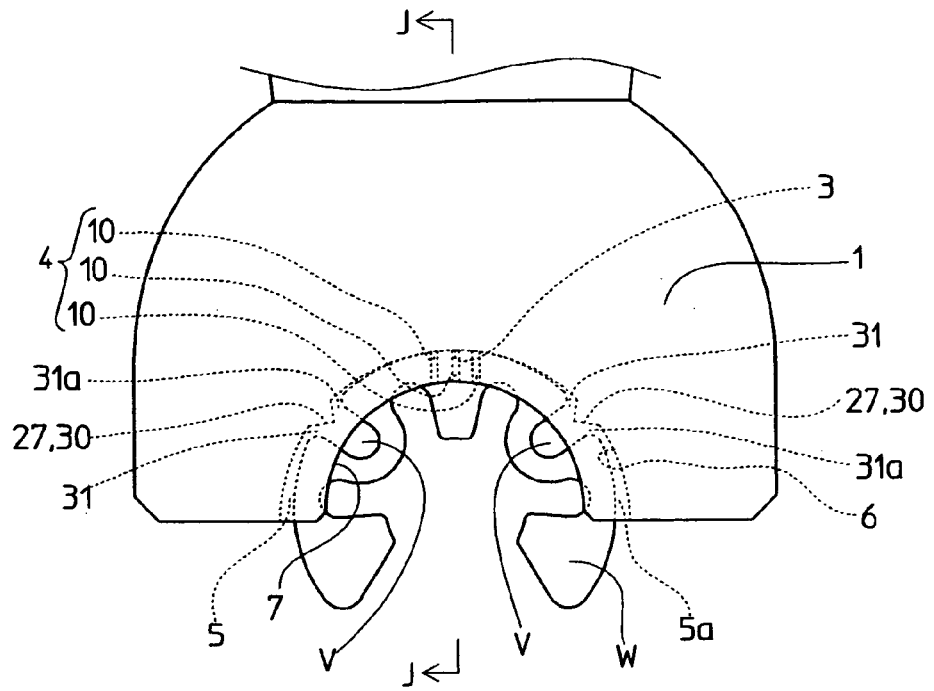
FIG. 16 is a front view of the end of the sixth embodiment of the tool for installing the retaining ring.
Figure 17:
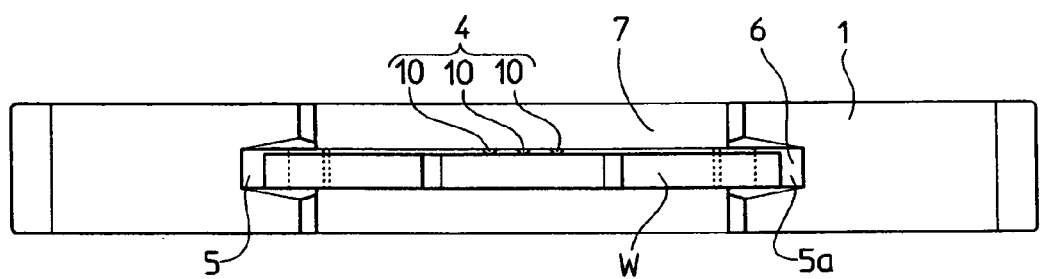
FIG. 17 is a bottom view of FIG. 16.
Figure 18:
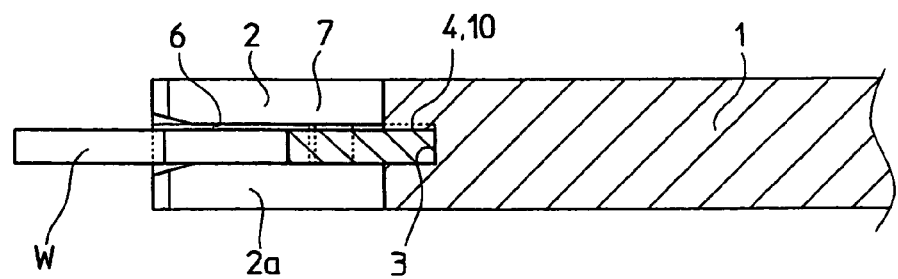
FIG. 18 is a sectional view of J—J of FIG. 16.

FIG. 10, FIG. 13 and FIG. 16 are a front view of the end of the fourth to sixth embodiments. FIG. 11, FIG. 14 and FIG. 17 are a bottom view of FIG. 10, FIG. 13 and FIG. 16. FIG. 12, FIG. 15, and FIG. 18 are a sectional view of H—H, I—I, and J—J of FIG. 10, FIG. 13 and FIG. 16. The movably inserted depression 6, the escape notch 7, and the sheltering spaces 5, 5a that are similar to the first embodiment shall be the fall-off prevention means 4 similar to the third embodiment.

In addition, the tool of the fourth embodiment is for the retaining ring W having a cut V on the portion opposite to the opening Y as shown in FIG. 50(c). A protrusion 30 positioned in the cut V of the retaining ring W in its installed state and protruded from the inner peripheral bottom of the center area of the movably inserted depression 6 shall be the position control means 27, and at the back area in the inner periphery of the movably inserted depression 6 shall be the contact portion 3. In addition, gaps 13, 13a are formed between the both sides of the protrusion 30 and the cut V of the retaining ring W in its installed state.

In addition, the tool of the fifth and sixth embodiments is for the retaining ring W having 2 cuts V, V at the portion opposite to the opening Y. The fifth embodiment is for the retaining ring W having shallow cuts V, V as shown in FIG. 50(d), and the sixth embodiment is for the retaining ring W having deep cuts V, V as shown in FIG. 50(e). The protrusions 30, 30 positioned in the cut V, V of the retaining ring W in its installed state and protruded from the inner peripheral bottom of the movably inserted depression 6 shall be the position control means 27, and the back area of the movably inserted depression 6 (areas between the protrusions 30, 30) shall be the contact portion 38

In addition, gaps 31, 31a are formed between the both sides of the respective protrusions 30, 30, and between the respective cuts V, V of the retaining ring W in its installed state.

Figure 19:
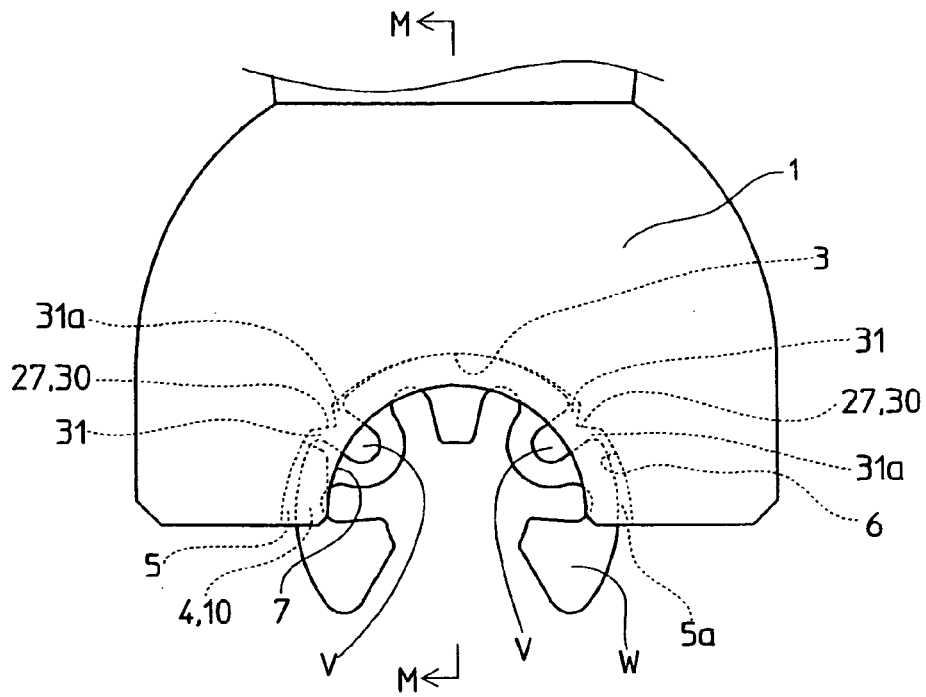
FIG. 19 is a front view of the end of the seventh embodiment of the tool for installing the retaining ring.
Figure 20:
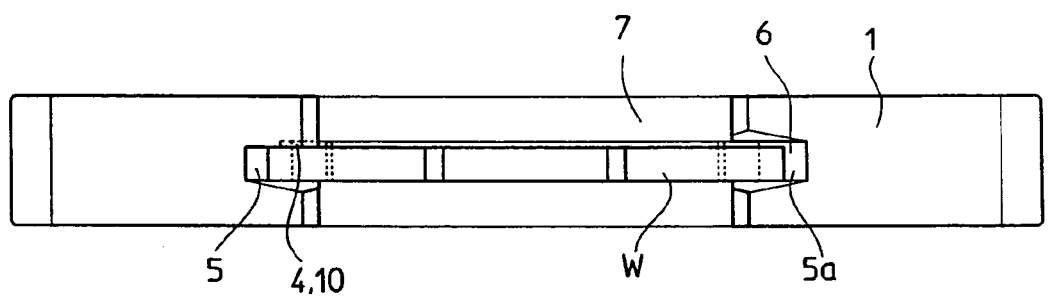
FIG. 20 is a bottom view of FIG. 19.
Figure 21:
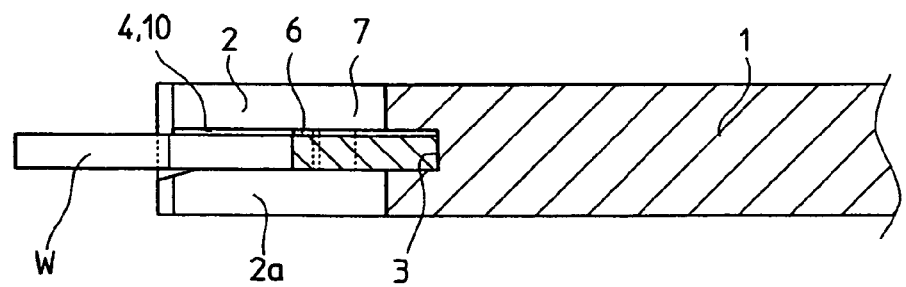
FIG. 21 is a sectional view of M—M of FIG. 19.
Figure 22:
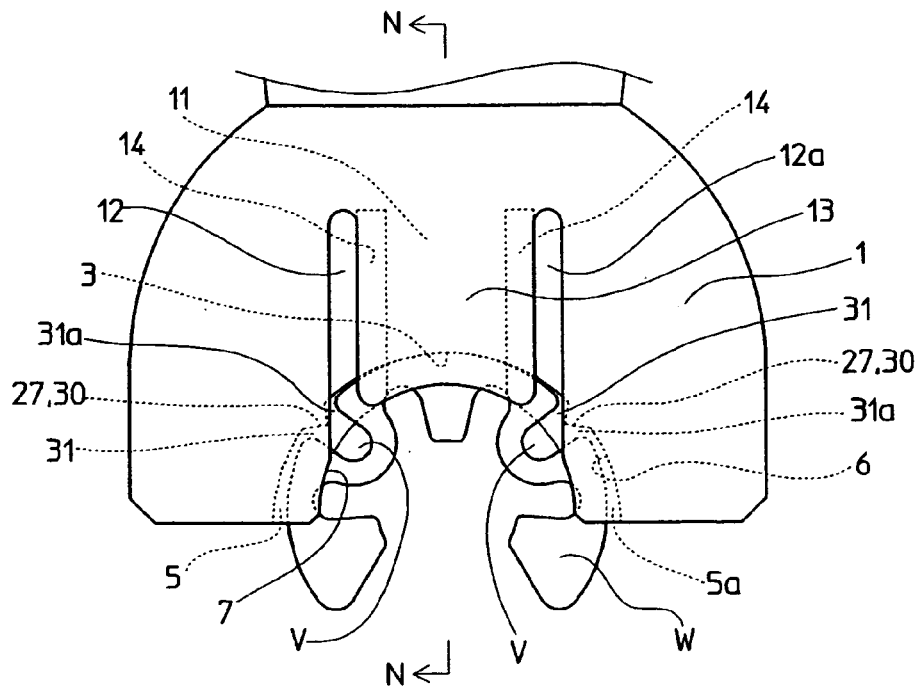
FIG. 22 is a front view of the end of the eighth embodiment of the tool for installing the retaining ring.
Figure 23:
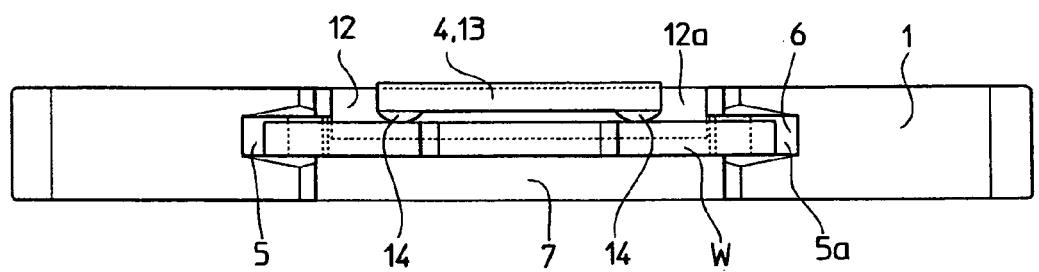
FIG. 23 is a bottom view of FIG. 22.
Figure 24:
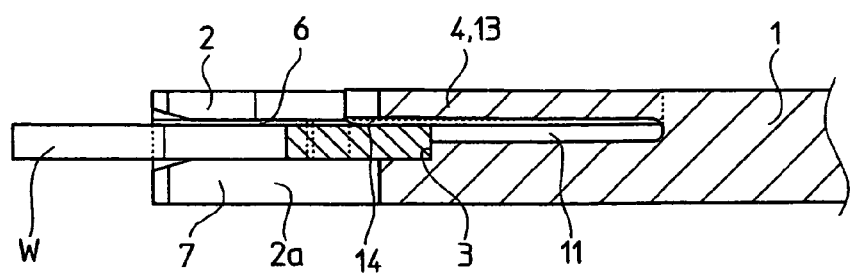
FIG. 24 is a sectional view of N—N of FIG. 22.

As another embodiment of the fall-off prevention means 4, a protrusion 10 is formed on one internal surface of the movably inserted depression 6, and the fall-off prevention means 4 is formed on the other internal surface. Said protrusion 10 may be a jetty shaped one of the sixth embodiment, as shown in FIG. 16 to FIG. 18, that is integrally formed on one of the opposed internal surfaces in the movably inserted depression 6 or that of the seventh embodiment as shown in FIG. 19 to FIG. 21 that is formed on one internal surface of the part of the side at one end of the escape notch 7 in the movably inserted depression 6 and has a wide, planar contact area. Then, the configuration is such that the protrusion 10 and the other internal surface interpose the portion opposite to the opening Y in the retaining ring W or one of the side part.

EIGHTH EMBODIMENT (REFER TO FIG. 22 TO FIG. 24.)

In the innermost area of the movably inserted depression 6, a depression 11 that is narrower than the groove width of said movably inserted depression 6 is contiguously formed to the front side of the holder 1. On the both sides of the depression 11 that is on the front side of the holder 1, a pair of elongate cuts 12, 12a that open in the escape notch 7 is formed, wherein the area between said cuts 12, 12a shall be an elastic sandwiched plate 13, and the protrusions 18 (2 protrusions on the drawing) are integrally formed on the inner surface of said sandwiched plate 13. In addition, steps defined at the border of the movably inserted depression 6 and the depression 11 shall be the contact portion 3.

NINTH EMBODIMENT (REFER TO FIG. 25 TO FIG. 27.)

Figure 25:
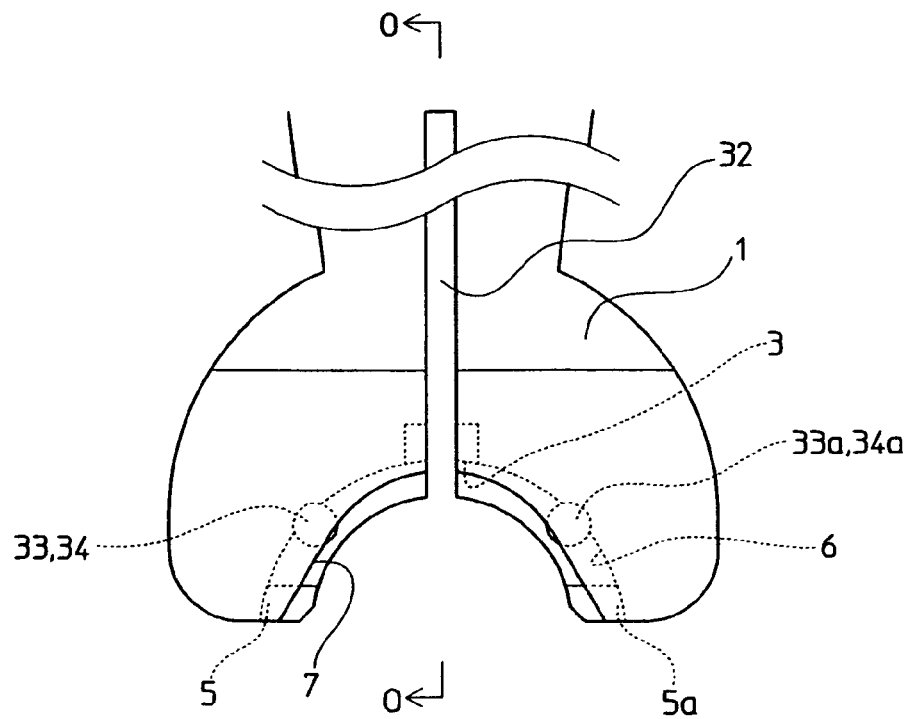
FIG. 25 is a front view of the end of the ninth embodiment of the tool for installing the retaining ring.
Figure 26:
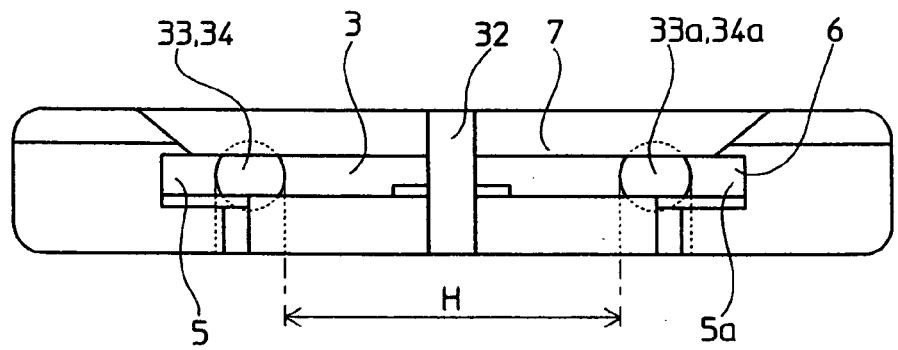
FIG. 26 is a bottom view of FIG. 25.
Figure 27:
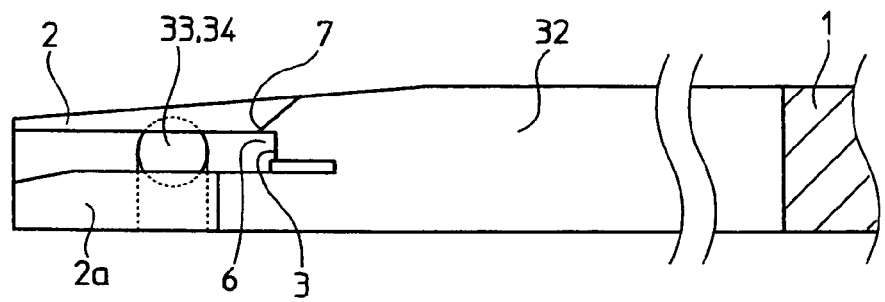
FIG. 27 is a sectional view of O—O of FIG. 25.

FIG. 25 to FIG. 27 are, respectively, a front view and a bottom view of the end of the ninth embodiment and a sectional view of O—O of FIG. 25. Although the movably inserted depression 6, the escape notch 7, and the sheltering spaces 5, 5a are formed similar to the first and second embodiments, not only a slit 32 is formed in the center of the holder 1 and can be expanded, but also the protrusions 33, 33a provided in 2 places in the back side of the movably inserted depression 6 shall be the fall-off prevention means 4 and the position control means 27. Said protrusions 33, 33a are formed by protruding in the movably inserted depression 6 a part of hard balls 34, 34a embedded in the holder 1. Then, not only dimension H between said protrusions 33, 33a is set slightly narrower than the dimension h between the angular apertures t, ta to the center in the cuts V, V provided in 2 places of the portion opposite to the opening Y in the retaining ring W as shown in FIG. 62(e), but also in installed state, the internal surfaces of the protrusions 33, 33a and the angular apertures t, ta of the retaining ring W are such arranged that they can be close.

In addition, although the protrusions 33, 33a may not take a sphere shape as shown, but be curved or planar (not shown), they must be such formed that the angular apertures t, ta of the retaining ring W can be close in installed state.

Figure 28:
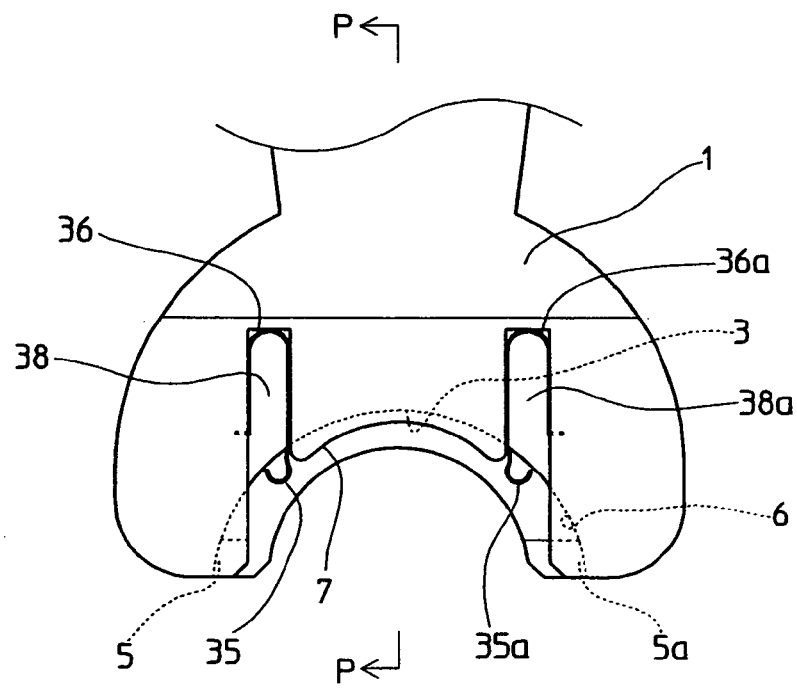
FIG. 28 is a front view of the end of the tenth embodiment of the tool for installing the retaining ring.
Figure 29:
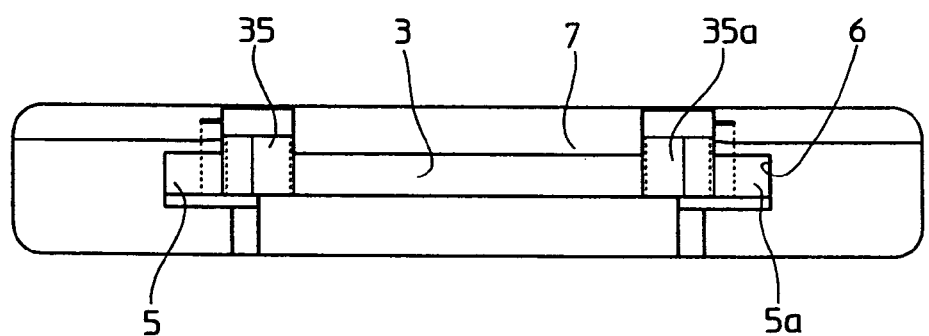
FIG. 29 is a bottom view of FIG. 28.
Figure 30:
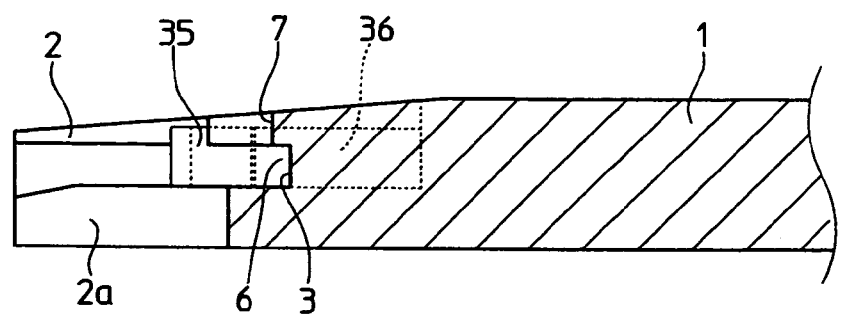
FIG. 30 is a sectional view of P—P of FIG. 28.
Figure 31:
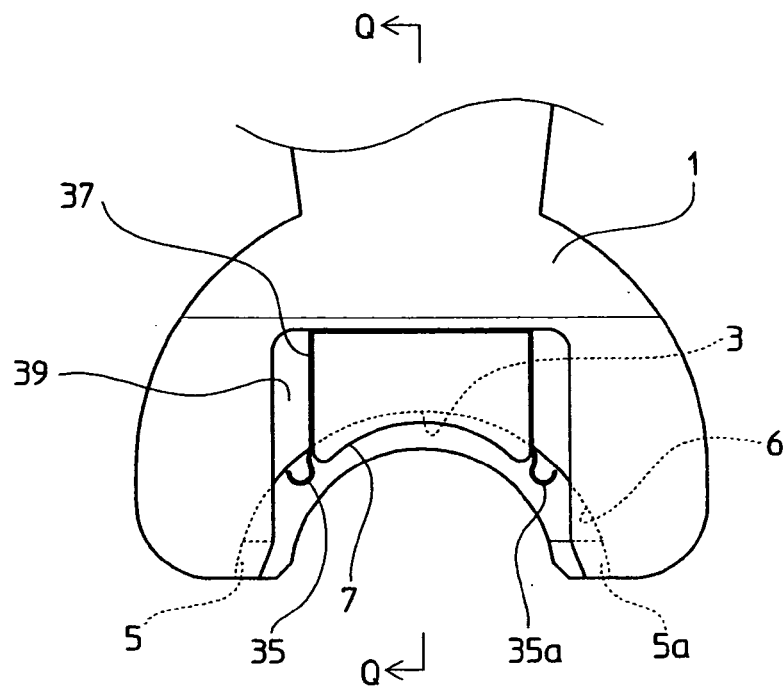
FIG. 31 is a front view of the end of the eleventh embodiment of the tool for installing the retaining ring.
Figure 32:
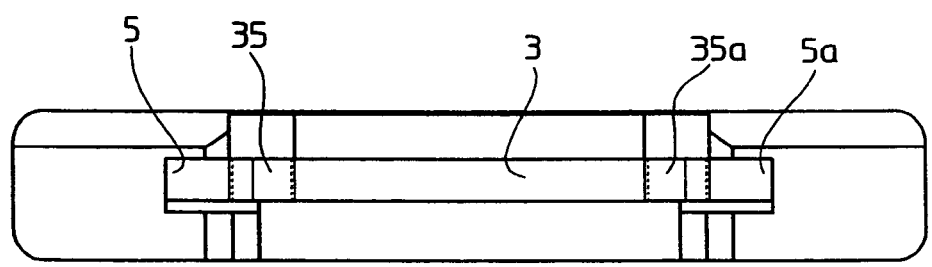
FIG. 32 is a bottom view of FIG. 31.
Figure 33:
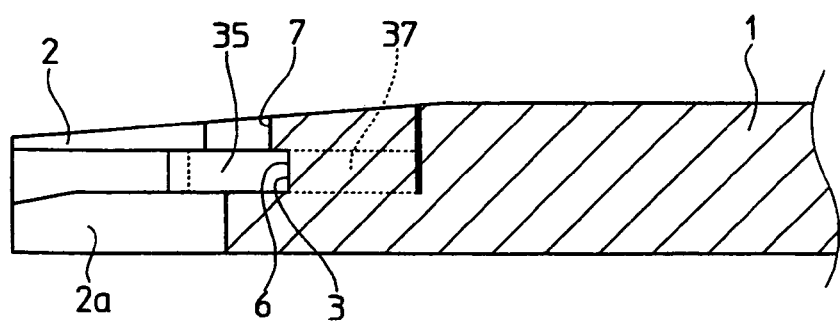
FIG. 33 is a sectional view of Q—Q of FIG. 31.
Figure 34:
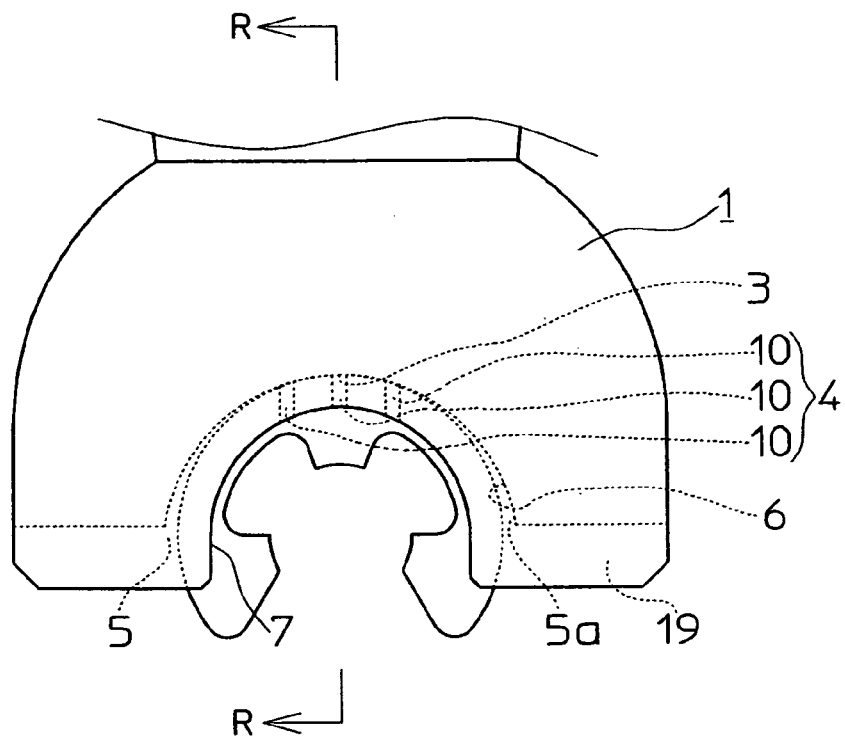
FIG. 34 is a front view of the end of the twelfth embodiment of the tool for installing the retaining ring.
Figure 35:
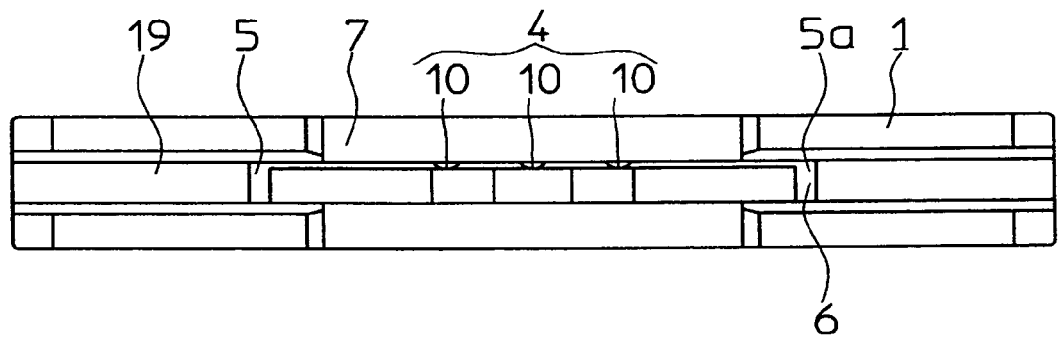
FIG. 35 is a bottom view of FIG. 34.
Figure 36:
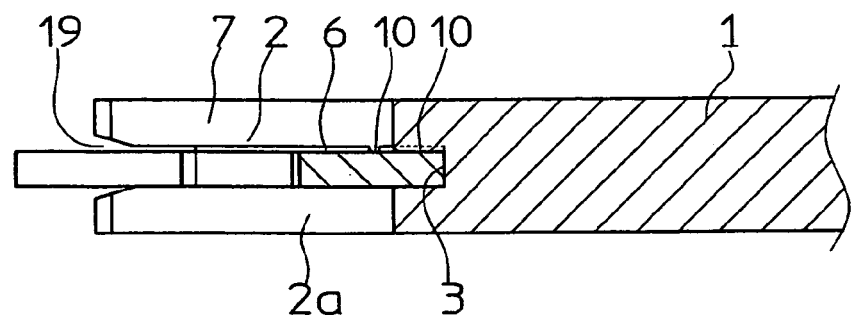
FIG. 36 is a sectional view of R—R of FIG. 34.
Figure 37:
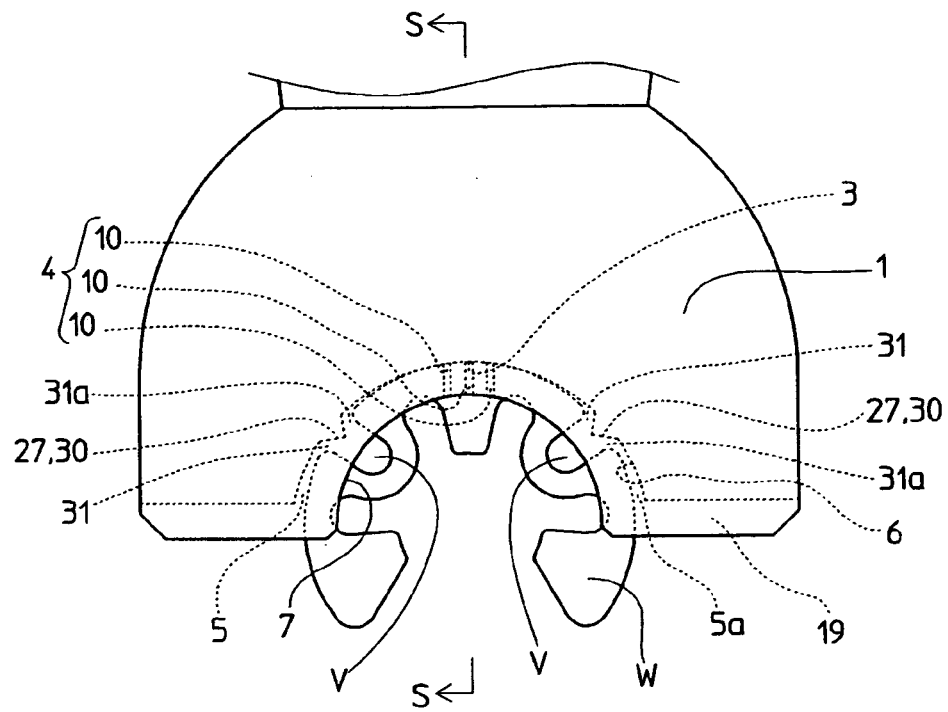
FIG. 37 is a front view of the end of the thirteenth embodiment of the tool for installing the retaining ring.
Figure 38:
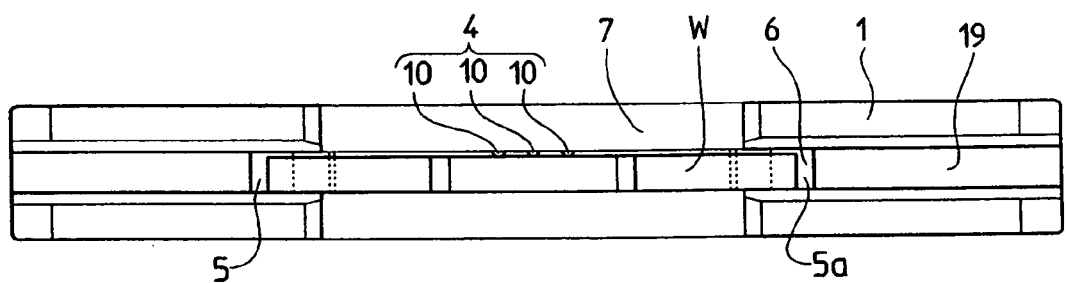
FIG. 38 is a bottom view of FIG. 37.
Figure 39:
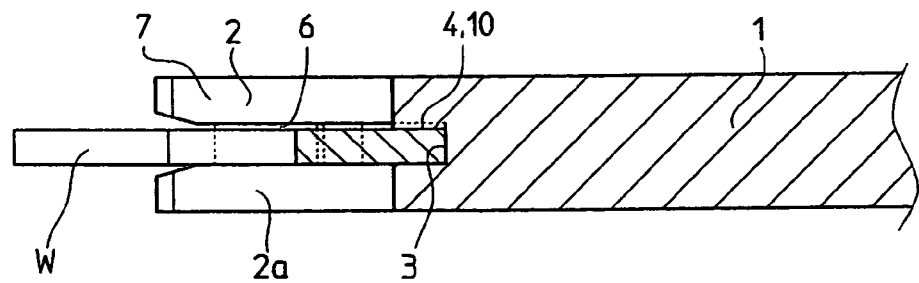
FIG. 39 is a sectional view of S—S of FIG. 37.
Figure 40:
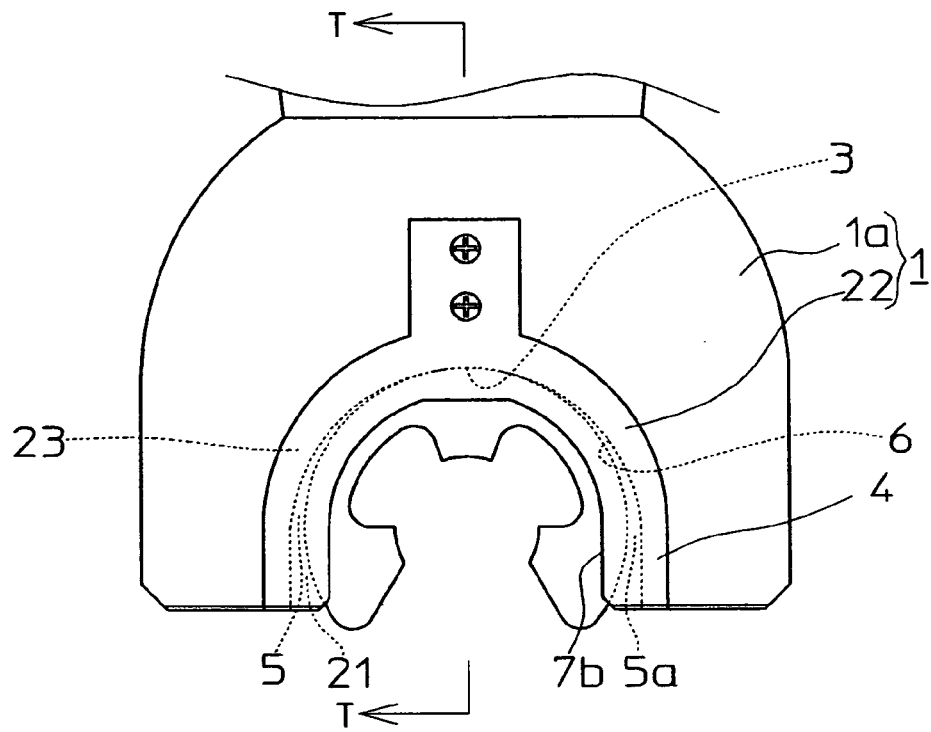
FIG. 40 is a front view of the end of the fourteenth embodiment of the tool for installing the retaining ring.
Figure 41:
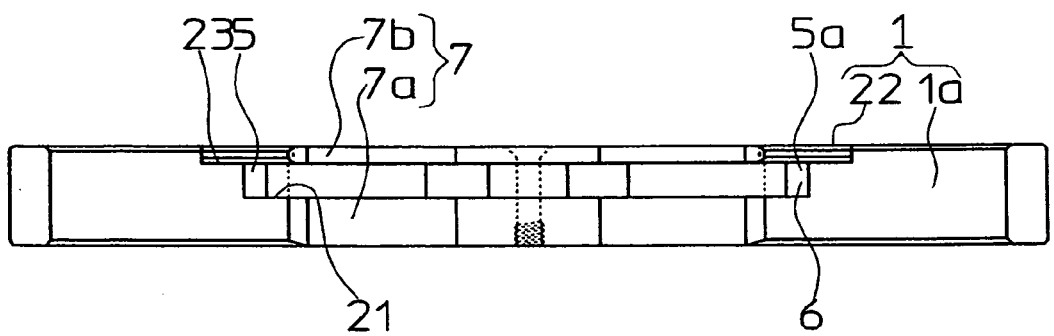
FIG. 41 is a bottom view of FIG. 40.
Figure 42:
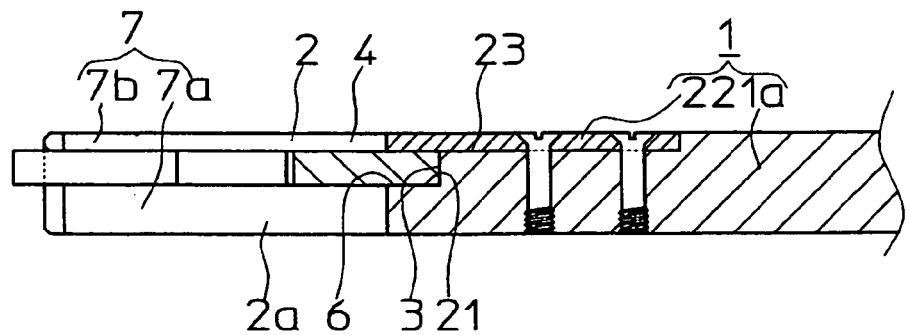
FIG. 42 is a sectional view of T—T of FIG. 40.

FIG. 28 and FIG. 31 are a front view of the end of the tenth and eleventh embodiments. FIG. 29 and FIG. 32 are a bottom view of FIG. 28 and FIG. 31. FIG. 30 and FIG. 33 are a sectional view of P—P and Q—Q of FIG. 28 and FIG. 31. Similar to the first and the second embodiments, although the movably inserted depression 6, the escape notch 7, and the sheltering spaces 5, 5a are formed, not only a pair of elastic bodies 35, 35a protruded from the inner peripheral bottom of the movably inserted depression 6 shall be the fall-off prevention means 4 and the position control means 27, but also an interval between said elastic bodies 35, 35a an interval between said elastic bodies 35, 35a is set narrower than the dimension between the angular apertures t, t to the center of the cuts V, V provided in 2 places of the portion opposite to the opening Y in the retaining ring W. The elastic bodies 35, 35a shall be ends of 2 almost U shaped flat springs 36, 36a embedded in both sides of the holder 1 in the tenth embodiment, and both ends of one gate shaped flat spring 37 embedded in the center of the holder 1 in the eleventh embodiment, and each of them is accommodated in and secured to containing depressions 38, 38a, and 39 respectively formed in the holder 1.

In the holder 1 shown in FIG. 10 and FIG. 13, the intermediate part on the both ends on the inner spherical bottom of the movably inserted depression 6 forms steps 20, 20a. Then, by setting the inside diameter of the parts on the both ends on the inner peripheral bottom larger than the areas between the steps 20, 20a, the sheltering spaces 5, 5a are defined between the both sides of the retaining ring W and the peripheral bottom of the movably inserted depression 6, and the inside diameter of the areas between the steps 20, 20a on the inner peripheral bottom shall be set identical to the outside diameter of the retaining ring W.

In addition, in the holder as shown in FIG. 1, FIG. 4, FIG. 7, FIG. 16, FIG. 19, FIG. 22, FIG. 25, FIG. 28, and FIG. 31, by setting the inner peripheral bottom of the movably inserted depression 6 as the inner periphery that is larger than the outside diameter of the retaining ring W and having a constant curvature, the sheltering spaces 5, 5a are formed between the both sides of the retaining ring W and the inner peripheral bottom of the movably inserted depression 6.

In addition, as with the twelfth and thirteenth embodiments shown in FIG. 34 to FIG. 39, grooves 19 may be formed at the center of the end surface of the holder 1 and across the width direction, and said grooves 19 may be the sheltering spaces 5, 5a.

In other words, although the sheltering spaces 5, 5a are formed between the both sides of the retaining ring W in its installed state and the inner periphery of the movably inserted depression 6, they are formed therein simply because almost half of the outer periphery of the retaining ring W is inserted into the movably inserted depression 6.

Thus, if the movably inserted depression 6 is shallow and only a part of the portion opposite to the opening Y in the retaining ring W is inserted, the area outside of the both sides of the protrusions from the end of the holder 1 in the retaining ring W shall be the sheltering spaces 5, 5a.

In said embodiment, being integrally formed, however, as with the fourteenth and fifteenth embodiments as shown in FIG. 40 to FIG. 45, not only a semicircular notch 7a is formed on the surface of the heads of the main body of the holder 1a, but also steps 21 are formed in the perimeter on the front side of said notch 7a. On the other hand, a mounting plate 22 at the end of which a semicircular escape notch 7b is formed is integrally secured to the front side of the holder main body 1a. Then, the steps 21 and the mounting plate 22 shall form the movably inserted depression 6, and the notches 7a, 7b shall form the escape notch 7, and thus the sheltering spaces 5, 5a are formed between the both sides of the retaining ring W and the inner peripheral bottom of the movably inserted depression 6. In addition, on the front side of the holder main body 1a, the mounting plate 22 is fit into a depression 23 that has the same shape as the mounting plate 22 and the depth identical to thickness of said mounting plate 22.

Figure 43:
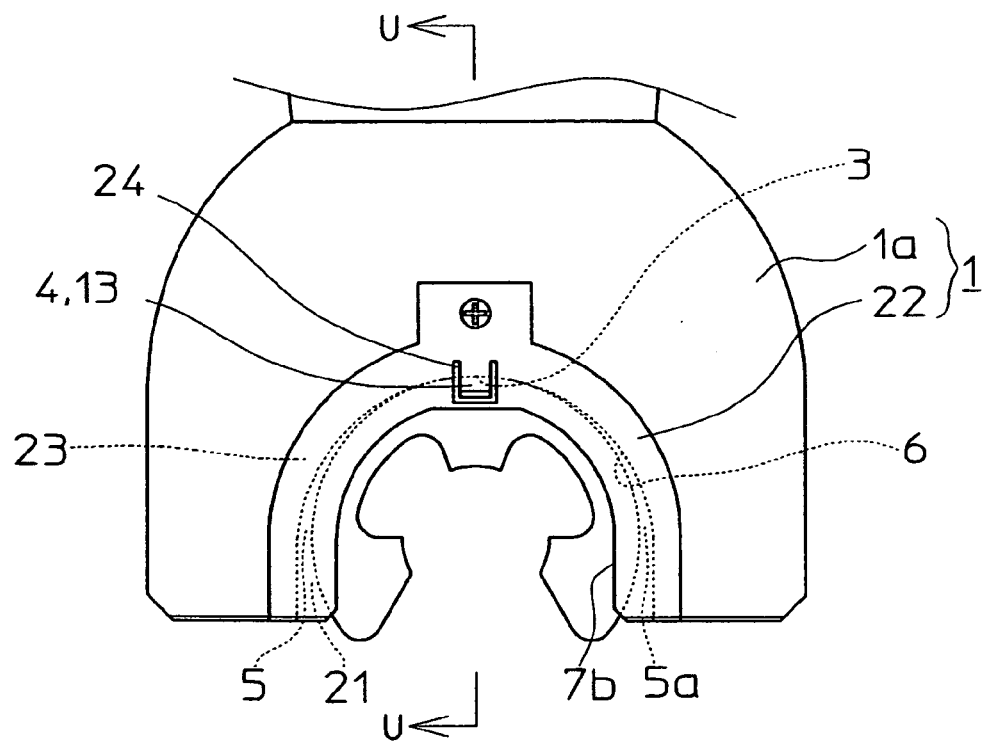
FIG. 43 is a front view of the end of the fifteenth embodiment of the tool for installing the retaining ring.
Figure 44:
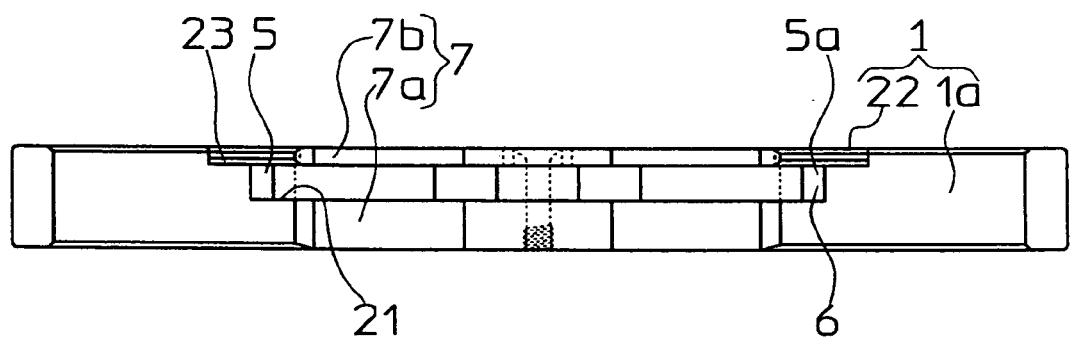
FIG. 44 is a bottom view of FIG. 43.
Figure 45:
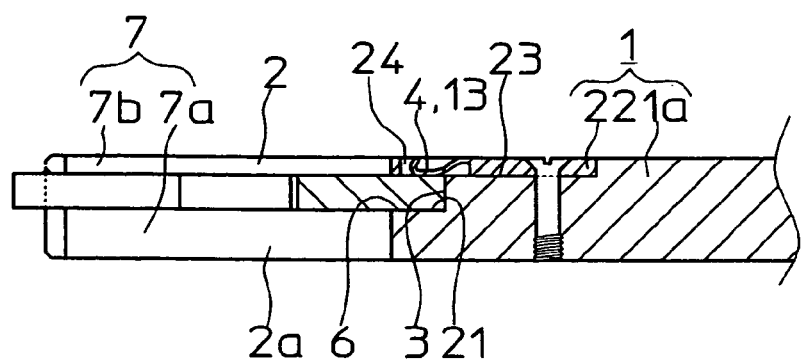
FIG. 45 is a sectional view of U—U of FIG. 43.

In the holder 1 of the fifteenth embodiment as shown in FIG. 43 to FIG. 45, in particular, not only a window 24 is formed in the part in the mounting plate 22 corresponding to the back area of the movably inserted depression 6 is opened and formed, and the sandwiched plate 13 is integrally formed in said window 24 with the base end as a fixed end.

Figure 46:
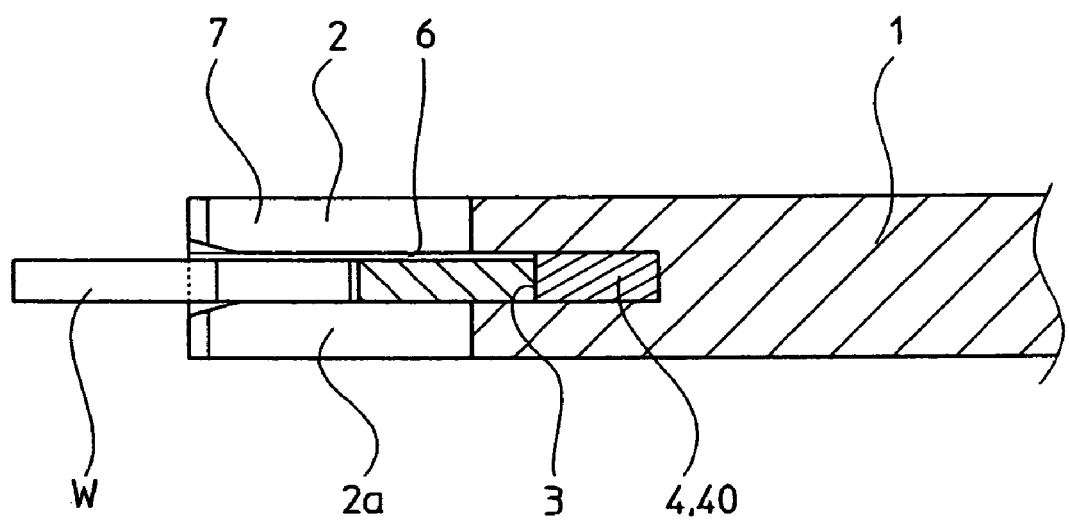
FIG. 46 is a sectional view showing 2 patterns of the end of the sixteenth embodiment of the tool for installing the retaining ring.
Figure 46:
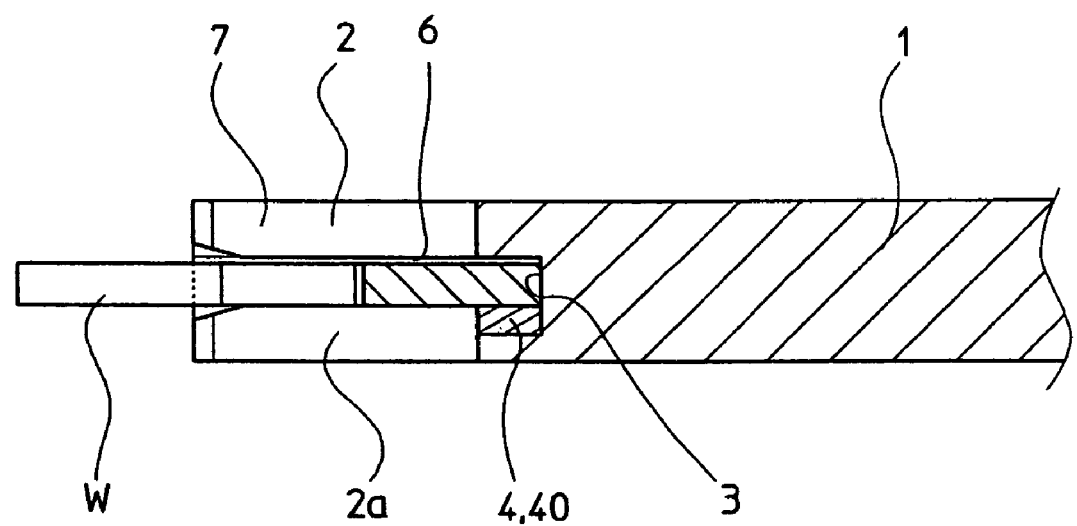

A fall-off prevention means 4 may not be limited to those shown in the respective embodiments described above. For instance, the contact portion with the retaining ring W in the holder 1, to be specific, like the sixteenth embodiment as shown in FIG. 46(a) and (b), a magnet 40 embedded in the internal surface or the inner periphery of the movably inserted depression 6 may be the fall-off prevention means 4

In addition, although the holder 1 shown in the respective front views and the respective sectional views of the drawings is represented by changing the ratio of horizontal and vertical size so that they can be thicker than the real holder, in order to facilitate understanding of the structure thereof, the real holder is set shallower than the width of the circumferential grooves (not shown) of the shaft to which it is fixed.

Figure 47:
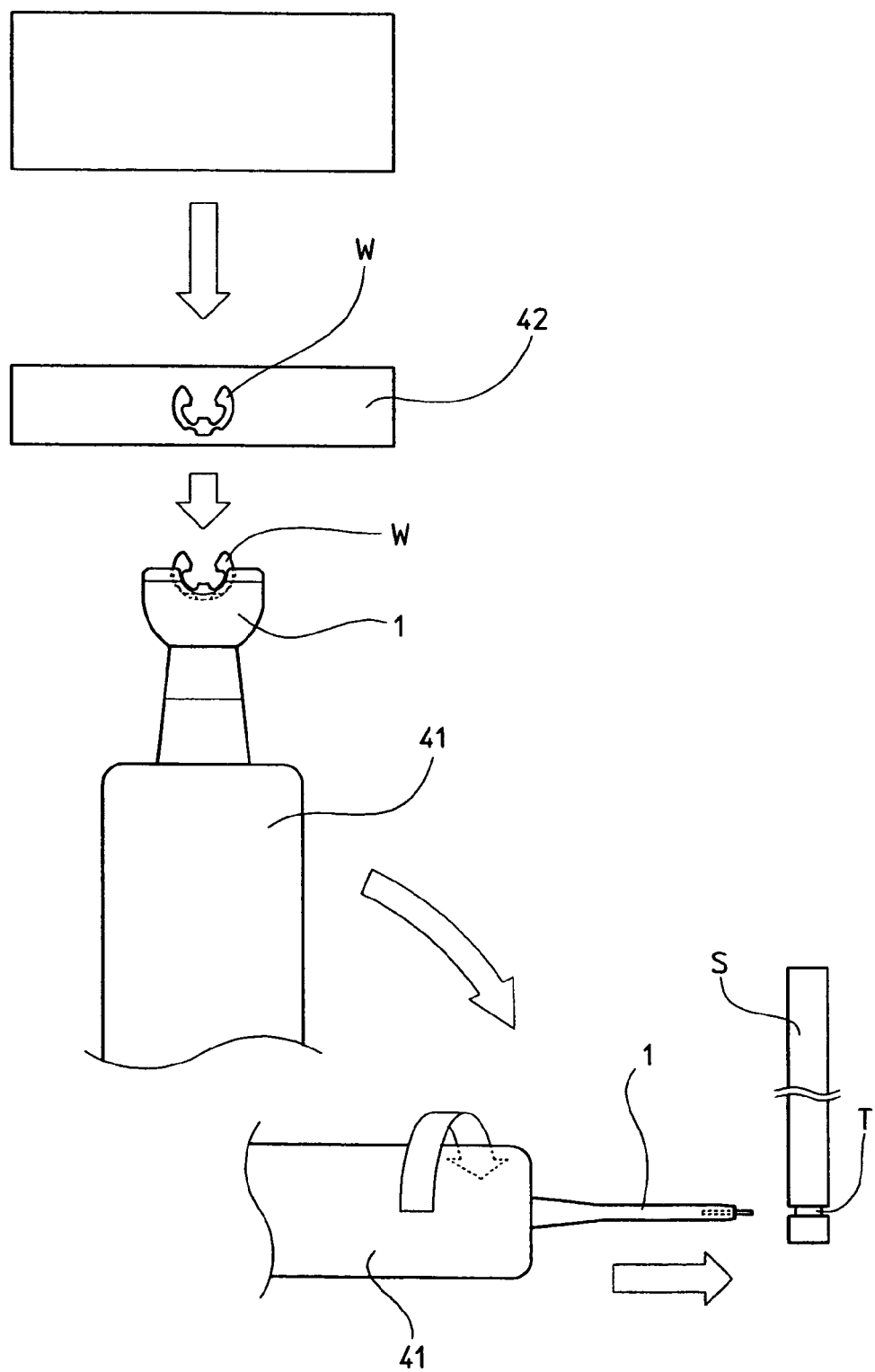
FIG. 47 is a schematic diagram of an automatic fitting machine with the tool for installing the retaining ring mounted.
Figure 48:
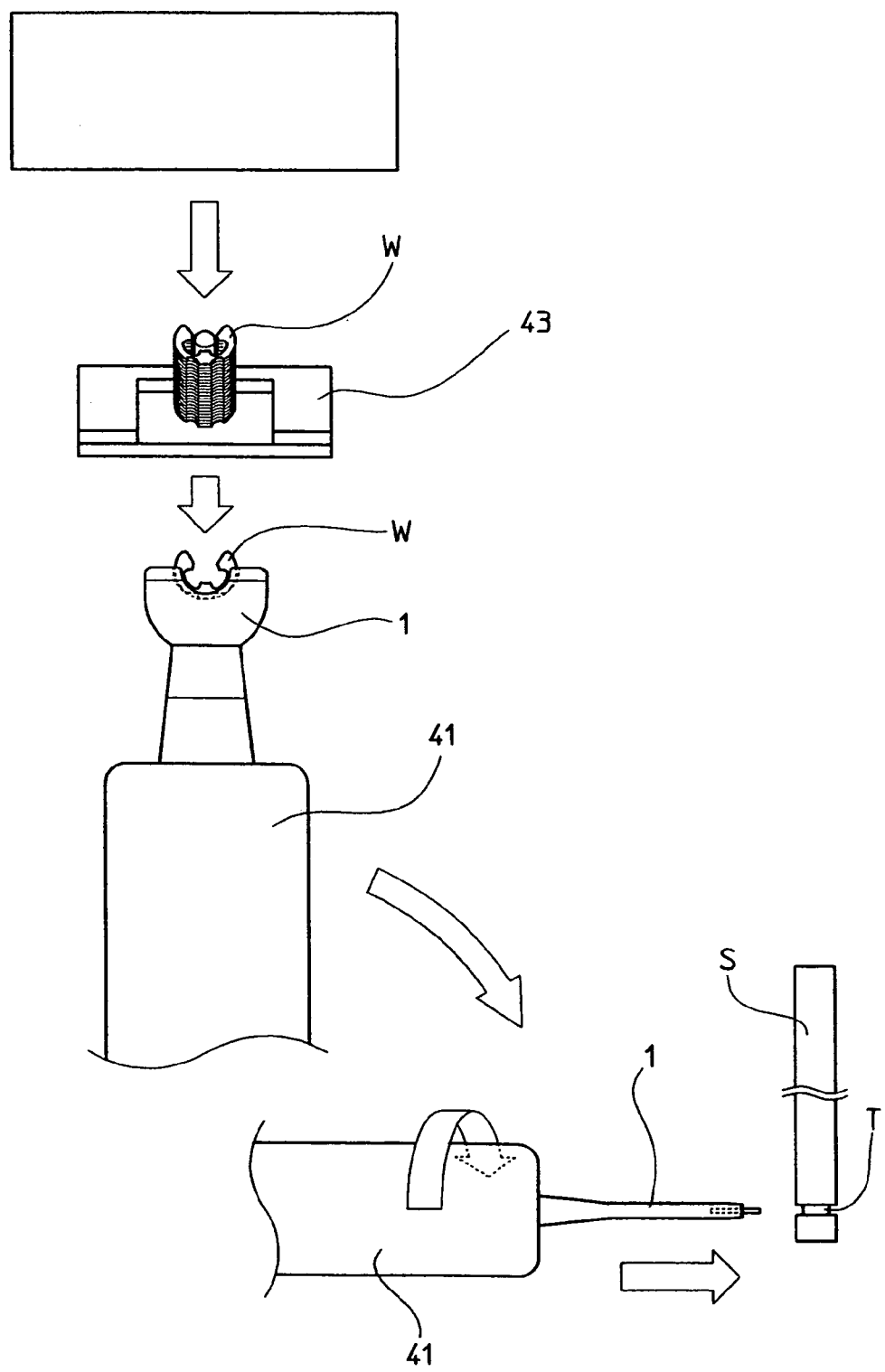
FIG. 48 is a schematic diagram of another embodiment of FIG. 47.

In addition, the tool for installing the retaining ring according to the present invention may be a manually-operated tool or used as a tool to be mounted to a tool mount area 41 in an automatic fitting machine, as shown in FIG. 47 and FIG. 48. It is configured to fit a retaining ring on the shaft S by shifting it to the tool mount area 41, after picking one from a plurality of retaining rings W arranged by a part feeder 42 as shown in FIG. 47, or after picking one from a holder 43 in which the plurality of retaining rings W are arranged as shown in FIG. 48.

In the following, operation of the tool for installing the retaining ring according to the present invention is described.

First, when the retaining ring W is inserted into the movably inserted depression 6 from the opening at the end of the holder 1, the fall-off prevention means 4 secures the retaining ring W.

Figure 49:
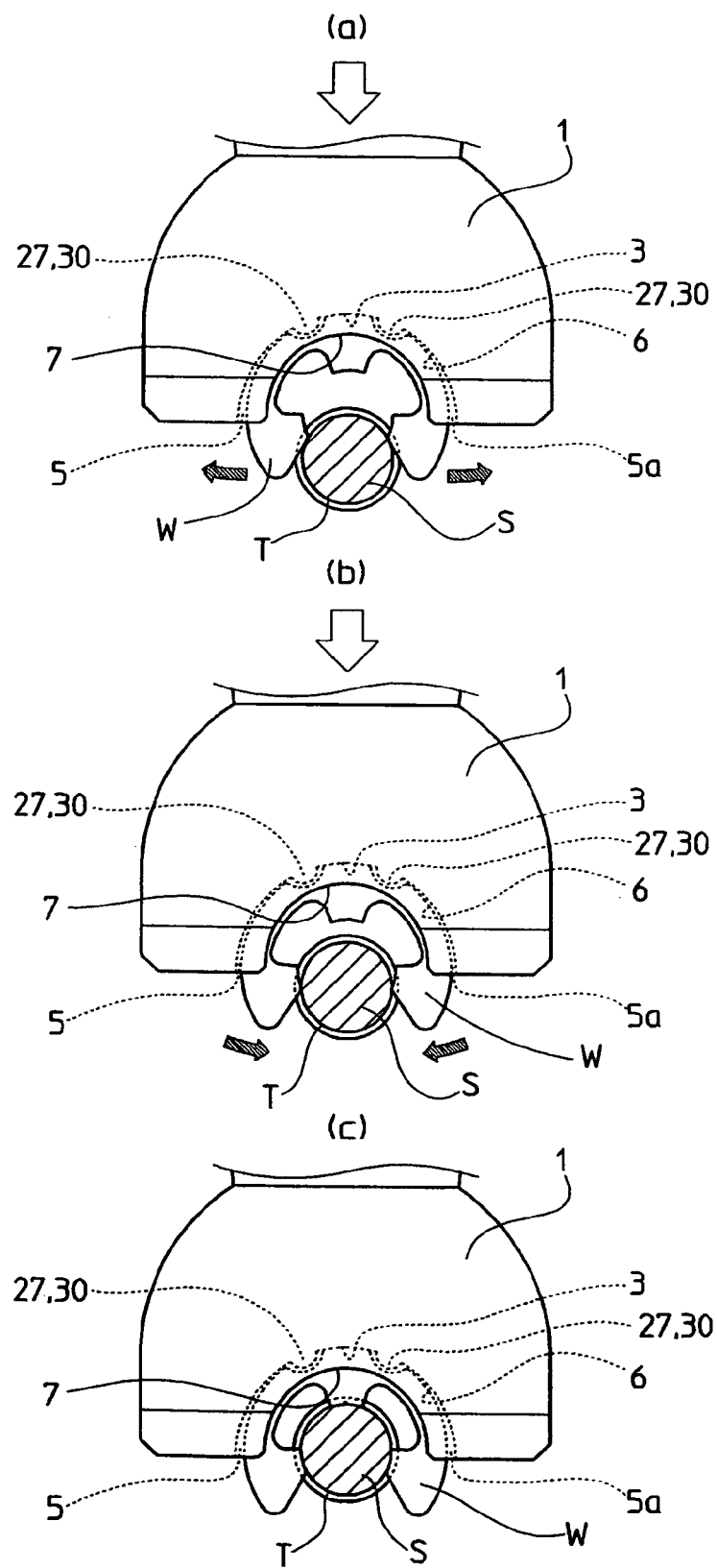
FIG. 49 is a phase diagram showing the process of fitting the retaining ring.

Then, as shown in FIG. 49(a), both sides of the opening Y of the retaining ring W are applied to annular grooves T of a shaft S. Then, as shown in FIG. 49(b), when the tool for installing the retaining ring is pressed, not only the retaining ring W abutting the contact portion 3 moves together with the tool for installing the retaining ring, but also the opening Y expands, thus pressing and opening the retaining ring W. However, both sides of the retaining ring W do not abut the holder 1 because of the sheltering spaces 5, 5a arranged outside of it. Thus, the retaining ring W can be pressed and opened reasonably, and pulling of the tool for installing the retaining ring after it is fitted to the annular grooves S, as shown in FIG. 49(c), detaches the retaining ring W from the fall-off prevention means 4 of the holder 1.

In addition, in the tool for installing the retaining ring having the position control means 27, even if the retaining ring W rotates with respect to the holder 1 during fixing of the retaining ring W, it slightly moves and stops because the position control means 27 is positioned within the cut V.

In addition, in the tool for installing the retaining ring according to the ninth embodiment, when the retaining ring W is first inserted through the opening at the end of the holder 1 into the movably inserted depression 6, the slit 32 opens. Then, after the angular apertures t, ta of the retaining ring W overreach the protrusions 33, 33a, the slit 32 closes and the retaining ring W is secured.

Then, application of the both sides of the opening Y of the retaining ring W to the annular grooves T of the shaft S and pressing the tool for installing the retaining ring not only moves the retaining ring W abutting the contact portion 3 together with the tool for installing the retaining ring, but also expands the opening Y, thus pressing and opening the retaining ring W. However, since the sheltering spaces 5, 5a are arranged outside of the both sides of the retaining ring W, it does not hit the holder 1, the retaining ring W is expanded and opened reasonably. After the retaining ring W is fitted on the annular grooves S, pulling the tool for installing the retaining ring opens the slit 32, and detaches the retaining ring W from the fall-off prevention means 4 of the holder 1.

In addition, in the tool for installing the retaining ring according to the tenth and eleventh embodiments, first, when the retaining ring W is inserted through the opening at the ends of the holder 1 into the movably inserted depression 6, the elastic bodies 35, 35a are deformed, and the retaining ring W is secured due to elastic resilience of said elastic bodies 35, 35a.

Then, application of the both sides of the opening Y of the retaining ring W to the annular grooves T of the shaft S and pressing the tool for installing the retaining ring not only moves the retaining ring W abutting the contact portion 3 together with the tool for installing the retaining ring, but also expands the opening Y, thus pressing and opening the retaining ring W. However, the both sides of the retaining ring W does not hit the holder 1 because of the sheltering spaces 5, 5a arranged outside of it, and the retaining ring W is pressed and opened reasonably. Then, after the retaining ring W is fitted on the annular grooves S, pulling of the tool for installing the retaining ring easily detaches the retaining ring W from between the elastic bodies 35, 35a having the weak sandwiching force, and the elastic bodies 35, 35a return to the initial positions.

The invention claimed is:

1. A tool for installing a retaining ring such that the tool is to be used for the retaining ring which is provided with cuts in two places of a portion opposite to an opening in the retaining ring, wherein at an end surface of a holder provided at an end of the tool is formed a depression into which the portion opposite to the opening in the retaining ring is movably insertable, a full back surface of the depression at the end of the holder comprises plate members, and a back area in the inner periphery of the depression comprises a contact portion to contact the retaining ring at the portion opposite to the opening in the outer periphery of the retaining ring, the back area of said depression being provided with position control means positioned in the cuts of the retaining ring in an inserted state for controlling a position of the retaining ring in the inserted state, sheltering areas being arranged outside two sides of the retaining ring in the inserted state, and fall-off prevention means being provided at the holder for preventing fall-off of the retaining ring and from which the retaining ring can be easily detached, and wherein by providing a pair of protrusions in the back of the movably inserted depression, by setting a dimension between said protrusions narrower than a dimension of angular apertures to centers in the cuts in the two places of the portion opposite to the opening in the retaining ring, the protrusions shall be the fall-off prevention means and the position control means.

2. The tool for installing the retaining ring according to claim 1, wherein a slit is formed in a center portion of the holder.

3. A tool for installing a retaining ring such that the tool is to be used for the retaining ring which is provided with the cuts in two places of the portion opposite to an opening in the retaining ring, wherein at an end surface of a holder provided at an end of the tool is formed a depression into which the portion opposite to the opening in the retaining ring is movably inserted, a full back surface of the depression at the end of the holder comprises plate members, and a back area in the inner periphery of the depression comprises a contact portion to contact the retaining ring at the portion opposite to the opening in the outer periphery of the retaining ring, the back area of said depression being provided with position control means positioned in the cuts of the retaining ring in an inserted state for controlling a position of the retaining ring in the inserted state, sheltering areas being arranged outside two sides of the retaining ring in the inserted state, and fall-out prevention means being provided at the holder for preventing fall-off of the retaining ring and from which the retaining ring can be easily detached, and wherein by protruding a pair of elastic bodies from an inner peripheral bottom of the depression, and setting spacing between said elastic bodies narrower than a dimension between angular apertures to centers in the cuts in the two places of the portion opposite to the opening in the retaining ring, the elastic bodies shall be the fall-off prevention means and the position control means.

4. A tool for installing a retaining ring having an opening and an outer periphery with two cuts formed in the outer periphery in a portion opposite to the opening, the tool comprising:
   a holder provided at an end of the tool and having a depression formed at an end of the holder, the depression being sized for the portion of the retaining ring opposite to the opening to be movably insertable therein, a back surface of the depression comprising plate members, a central back portion in the depression being a contact area for contacting the portion of the outer periphery of the retaining ring opposite to the opening, and sheltering areas being formed in forward portions of the depression being arranged adjacent two sides of the retaining ring when the retaining ring is in an inserted state in the depression;
   position control means for controlling a position of the retaining ring by engaging the two cuts when the retaining ring is in an inserted state in the depression, the position control means being disposed at a back portion of the depression; and
   fall-off prevention means for preventing the retaining ring from falling off the holder, from which the retaining ring is easily detachable, the fall-off prevention means being disposed on the holder;
   wherein the position control means and the fall-off prevention means are both provided by a pair of members disposed in the back portion of the depression.

5. The tool for installing a retaining ring according to claim 4, wherein the pair of members comprises a pair of protrusions disposed in the back portion of the depression, a dimension between the protrusions being narrower than a dimension between the two cuts.

6. The tool for installing a retaining ring according to claim 4, wherein the pair of members comprises a pair of protruding elastic bodies extending from an inner peripheral bottom of the depression, a dimension between the protrusions being narrower than a dimension between the two cuts.

* * * * *